United States Patent [19]
Matsuoka

[11] Patent Number: 6,041,647
[45] Date of Patent: *Mar. 28, 2000

[54] CRANK ANGLE DETECTING APPARATUS FOR INTERNAL COMBUSTION ENGINE

[75] Inventor: Yuji Matsuoka, Nagoya, Japan

[73] Assignee: Toyota Jidosha Kabushiki Kaisha, Aichi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,459

[22] Filed: May 27, 1997

[30] Foreign Application Priority Data

May 28, 1996 [JP] Japan ................................. 8-133748

[51] Int. Cl.[7] .............................. F02D 45/00; G01P 3/42; F01L 1/34
[52] U.S. Cl. ........................................ 73/116; 123/90.17
[58] Field of Search ................................... 73/116, 117.2, 73/117.3; 123/419, 436, 90.17; 701/110, 111

[56] References Cited

U.S. PATENT DOCUMENTS

| | | | |
|---|---|---|---|
| 5,018,384 | 5/1991 | Hayashi et al. | 73/118.1 |
| 5,044,336 | 9/1991 | Fukui | 73/116 |
| 5,052,358 | 10/1991 | Fukui | 73/116 |
| 5,070,726 | 12/1991 | Fukui et al. | 73/116 |
| 5,070,727 | 12/1991 | Davis et al. | 73/116 |
| 5,079,945 | 1/1992 | Hansen et al. | 73/116 |
| 5,119,670 | 6/1992 | Whitehorn et al. | 73/116 |
| 5,353,635 | 10/1994 | Saiki et al. | 73/117.2 |
| 5,433,108 | 7/1995 | Sawada | 73/117.3 |
| 5,462,022 | 10/1995 | Ushida | 123/90.17 |

FOREIGN PATENT DOCUMENTS

| | | |
|---|---|---|
| 685707 | 2/1996 | European Pat. Off. . |
| 63-154828 | 6/1988 | Japan . |

*Primary Examiner*—George Dombroske
*Attorney, Agent, or Firm*—Kenyon & Kenyon

[57] ABSTRACT

A crank angle detecting apparatus for an internal combustion engine. A crank rotor rotates integrally with the engine crankshaft, and the crank rotor is marked with a pattern of indicia. Certain indicia demarcate a number of equal segments into which the crankshaft rotor is divided. Other indicia uniquely identify each segment. In one embodiment, no two adjacent segments have the same pattern of segment-identifying indicia. In another embodiment, no three adjacent segments have the same pattern of segment-identifying indicia. A detector senses the indicia as the indicia pass by the detector. A cam rotor rotates integrally with the engine cam shaft. The cam rotor is also marked with indicia, and a detector is positioned to detect the cam rotor indicia as they pass by. Based on signals from the detector, an ECU can determine the position of the crankshaft with respect to the engine cycle.

32 Claims, 18 Drawing Sheets

Fig.8

| X0 | X | NUMBER N |
|---|---|---|
| 0 | 1 | 0 |
| 1 | 2 | 1 |
| 2 | 0 | 2 |
| 0 | 2 | 3 |
| 2 | 3 | 4 |
| 3 | 0 | 5 |
| 0 | 3 | 6 |
| 3 | 4 | 7 |
| 4 | 0 | 8 |
| 0 | 4 | 9 |
| 4 | 1 | 10 |
| 1 | 0 | 11 |

Fig.18

| X | Y | Z | N1 |
|---|---|---|----|
| 1 | 1 | 2 | 0  |
| 2 | 1 | 1 | 1  |
| 1 | 2 | 1 | 2  |
| 2 | 1 | 2 | 3  |
| 2 | 2 | 1 | 4  |
| 1 | 2 | 2 | 5  |
| 3 | 1 | 2 | 6  |
| 3 | 3 | 1 | 7  |
| 1 | 3 | 3 | 8  |
| 3 | 1 | 3 | 9  |
| 2 | 3 | 1 | 10 |
| 1 | 2 | 3 | 11 |

Fig.19

| N1 | CCR | |
|----|-----|-----|
|    | F1: 1 | F1: 0 |
| 0  | 0  | 12 |
| 1  | 1  | 13 |
| 2  | 2  | 14 |
| 3  | 3  | 15 |
| 4  | 16 | 4  |
| 5  | 17 | 5  |
| 6  | 18 | 6  |
| 7  | 19 | 7  |
| 8  | 20 | 8  |
| 9  | 21 | 9  |
| 10 | 22 | 10 |
| 11 | 23 | 11 |

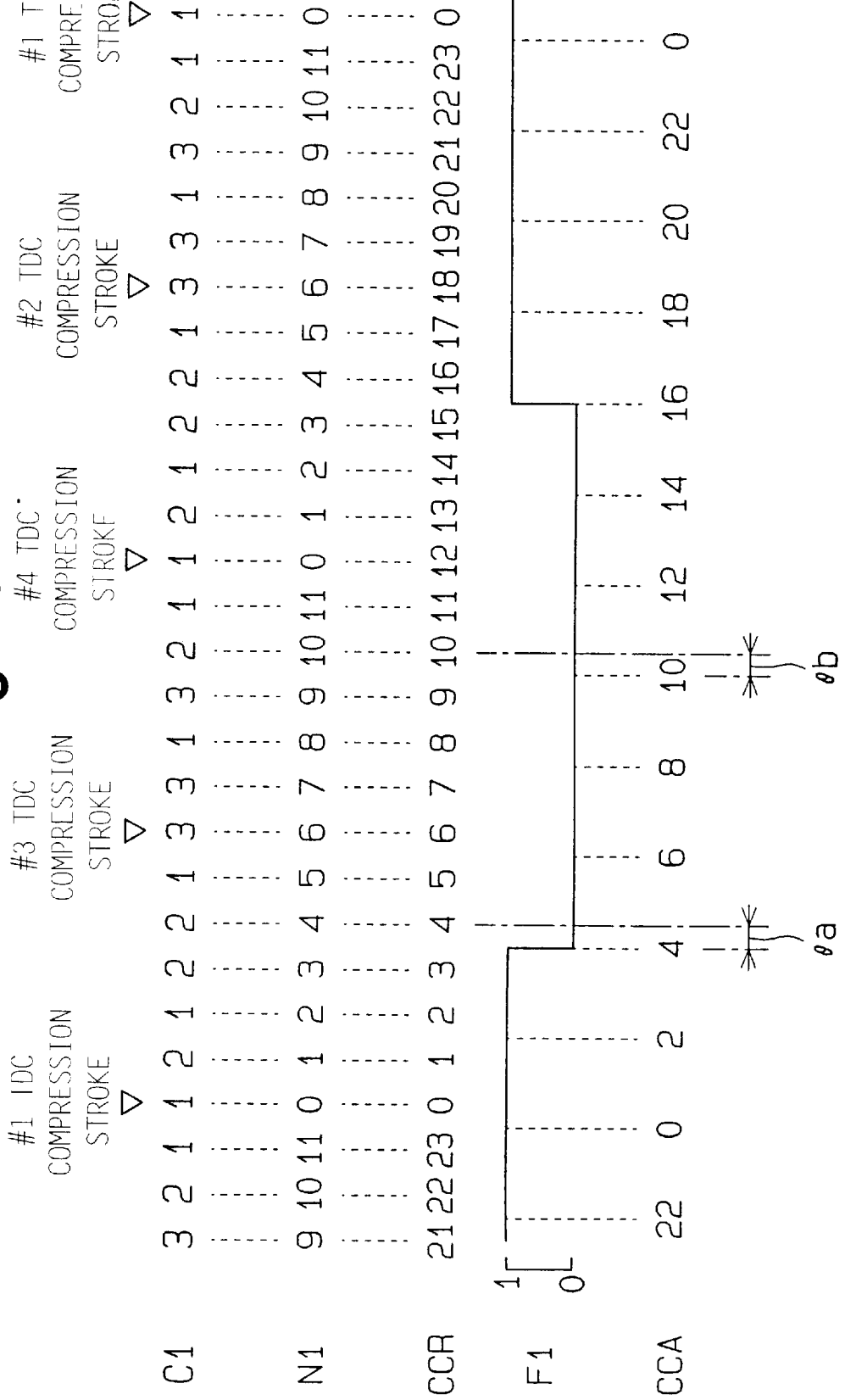

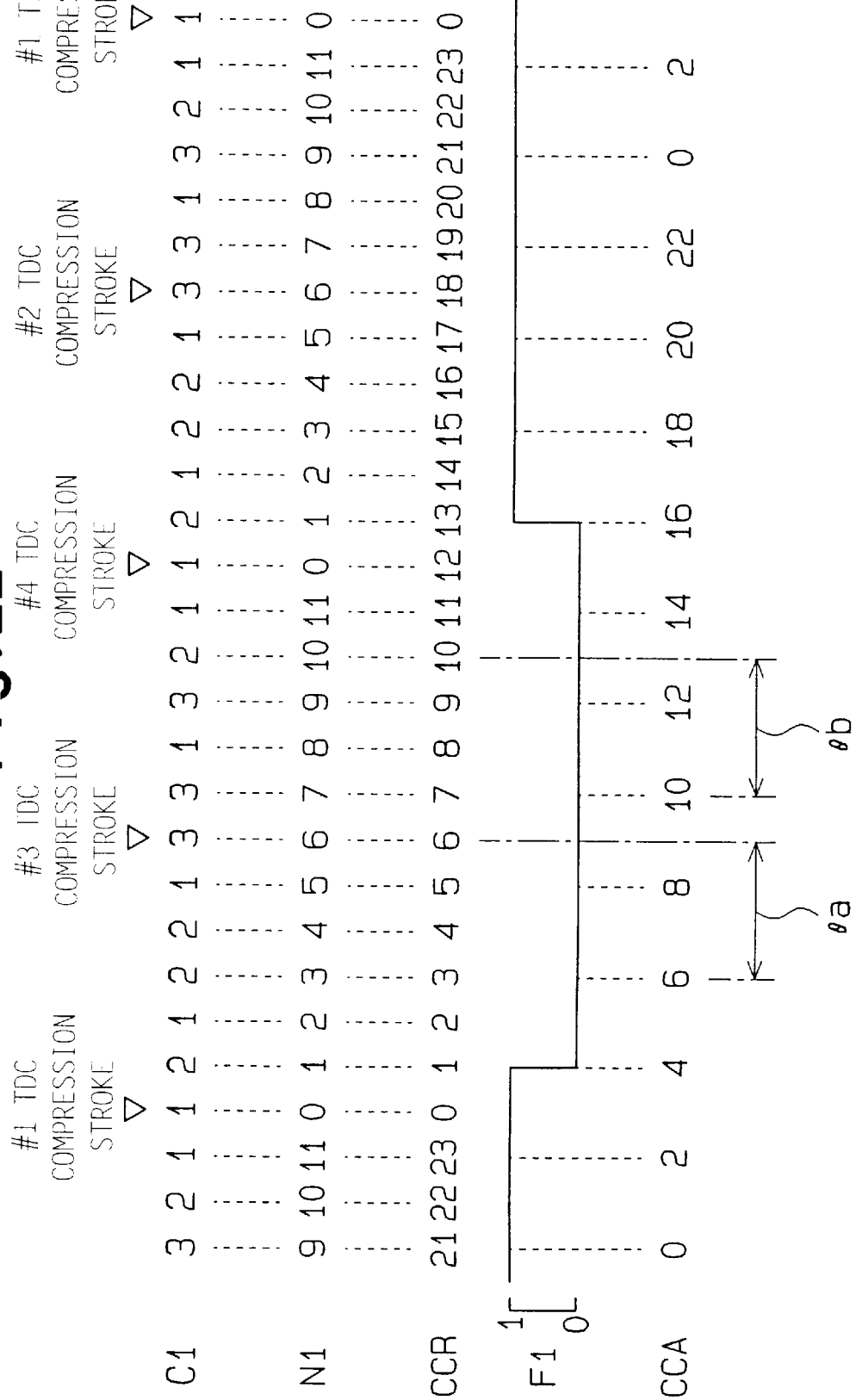

CRANK ANGLE DETECTING APPARATUS FOR INTERNAL COMBUSTION ENGINE

BACKGROUND OF THE INVENTION

1. Field of the Invention

The present invention relates to an apparatus for detecting the rotational position (crank angle) of the crankshaft of an internal combustion engine. More particularly, this invention relates to a crank angle detecting apparatus suitable for detecting the crank angle of an internal combustion engine having a plurality of cylinders.

2. Description of the Related Art

A reciprocating engine has a plurality of pistons retained in respective cylinders in a reciprocatable manner, and a crankshaft. The crankshaft has a plurality of cranks associated with the respective pistons. Each piston is coupled to the associated crank by a connecting rod. The reciprocation of each piston is converted to the rotary motion of the crankshaft via the connecting rod. The position of the piston in each cylinder correlates with the rotational position of the crankshaft. Therefore, the position of the piston in each cylinder of the engine can be discriminated by detecting the rotational position (crank angle) of the crankshaft.

Various timing controls including the ignition timing control and fuel injection timing control for an engine are executed based on the crank angle (denoted by "° CA") that is detected by a crank angle detecting apparatus.

Japanese Unexamined Patent Publication No. 5-288112 discloses this type of crank angle detecting apparatus. This detecting apparatus comprises an engine speed sensor disposed near a crankshaft and a timing sensor disposed near a cam shaft. The engine speed sensor has a crank rotor, which rotates together with the crankshaft, and an electromagnetic pickup provided to face the outer surface of the rotor. The crank rotor has a plurality of projections provided on its outer surface at intervals of 30° CA. The crank rotor further has a gap portion formed on its outer surface by removing one projection. The timing sensor has a cam rotor, which rotates together with the cam shaft, and an electromagnetic pickup provided to face the outer surface of this rotor. The cam rotor has a single projection on its outer surface. Every time this projection passes the pickup of the timing sensor, or every time the cam rotor rotates 360°, the pickup sends a timing signal to a controller. As the cam rotor rotates 360°, the crankshaft rotates 720° CA.

When the aforementioned gap portion passes in front of the pickup of the engine speed sensor, the pickup sends a reference position signal to the controller. When this reference position signal is output, the crankshaft is positioned at a specific reference position. Thereafter, every time a projection of the crank rotor passes the pickup of the engine speed sensor, the pickup sends a pulse signal to the controller. The controller counts the number of the pulse signals and determines if the timing signal from the timing sensor has been input when the count value reaches a predetermined value. Then, the controller acquires a crank angle corresponding to a specific cylinder based on the result of the determination. The time at which the count value reaches the predetermined value follows soon after the generation of the reference position signal. That is, the time of the generation of the timing signal comes soon after the generation of the reference position signal.

As apparent from the above, the provision of the two sensors, the engine speed sensor and the timing sensor, allows the crank angle corresponding to a specific cylinder of a multi-cylinder engine to be detected. Based on the detected crank angle, the ignition timing control, fuel injection timing control and the like associated with each cylinder are properly carried out. The timing signal is generated very soon after the generation of the reference position signal. When cranking causes the crankshaft to rotate to a position slightly over the reference position corresponding to the generation of the reference position signal, a crank angle corresponding to a specific cylinder can be certainly detected.

The reference position signal is output from the engine speed sensor every time the crankshaft makes a rotation of 360° CA. When the engine stops with the gap portion of the crank rotor beyond the associated pickup, the first reference position signal is sent out from the engine speed sensor after cranking causes the crankshaft to turn approximately 360° CA. In other words, until cranking causes the crankshaft to turn approximately 360° CA, a crank angle corresponding to a specific cylinder cannot be detected. In an engine that employs a distributor-less ignition system, unless a crank angle corresponding to a specific cylinder can be detected, a cylinder to be ignited and the timing for igniting that cylinder cannot be determined and ignition cannot be initiated. This delays the start of the engine.

As a solution to the above problem, two gap portions may be provided on the outer surface of the crank rotor at an interval of 180° CA and two projections may be provided on the outer surface of the cam rotor at an interval of 180° CA. This structure however disables the controller's ability to determine with which one of the two gap portions the reference position signal received from the engine speed sensor is associated. Further, when having received the timing signal from the timing sensor, the controller cannot determine with which one of the two projections the signal is associated. It is therefore not possible to detect a crank angle corresponding to a specific cylinder.

SUMMARY OF THE INVENTION

Accordingly, it is a primary objective of the present invention to provide a crank angle detecting apparatus for an internal combustion engine, which can detect a crank angle in as short a time as possible from the beginning of cranking.

To achieve this object, this invention teaches the following crank angle detecting apparatus for an internal combustion engine. This internal combustion engine has a plurality of cylinders each retaining a piston, and a crankshaft operationally coupled to the pistons and rotatable with two rotations as one rotational cycle. The piston in each cylinder performs one cycle of strokes during two rotations of the crankshaft. The one cycle of strokes is carried out in the plurality of cylinders with time phases in accordance with a rotational position of the crankshaft in one rotational cycle. The crank angle detecting apparatus comprises a crank rotor provided on the crankshaft to be rotatable with the crankshaft; a plurality of first to-be-detected portions provided on and all over the crank rotor at equal intervals in a circumferential direction of the crank rotor, the crank rotor having areas each provided between each adjoining two first to-be-detected portions; a plurality of second to-be-detected portions provided in each of the areas on the crank rotor, a combination of numbers of the second to-be-detected portions located on at least two consecutive areas being different from a combination of numbers of the second to-be-detected portions located on another at least two consecutive areas; first detecting means, so positioned as to face rotational loci of both the first to-be-detected portions and the second to-be-detected portions, for detecting the first and second to-be-detected portions which pass a position facing the first detecting means in accordance with rotation of the crank rotor; first counting means for counting the number of the second to-be-detected portions in each area based on detection of the first and second to-be-detected portions by the first detecting means; signal generation means for alternately generating a first signal and a second signal different from the first signal every time the crankshaft makes one rotation; and discrimination means for discriminating the rotational position of the crankshaft in one rotational cycle when the first to-be-detected portions are detected by the first detecting means, based on both a combination of numbers of the second to-be-detected portions located on at least two consecutive areas, acquired based on a count value from the first counting means, and the signal generated by the signal generation means.

The other aspects and advantages of this invention will be readily apparent from the following description by reference to the accompanying drawings illustrating the principle of this invention.

BRIEF DESCRIPTION OF THE DRAWINGS

FIG. 8 is an explanatory diagram showing table data in a RAM;

FIG. 18 is an explanatory diagram showing a map in which numbers associated with values in first to third memory areas have been defined previously;

FIG. 19 is an explanatory diagram showing a map in which count values of the crank counter associated with the numbers and flag values have been defined previously;

FIG. 21 is a timing chart for explaining the operation when the rotational phase of the cam shaft with respect to the crankshaft is most delayed; and FIG. 22 is a timing chart for explaining the operation when the rotational phase of the cam shaft with respect to the crankshaft is most advanced.

DETAILED DESCRIPTION OF THE PREFERRED EMBODIMENTS

The first embodiment of the present invention will now be described with reference to FIGS. 1 through 10.

Figure 1:
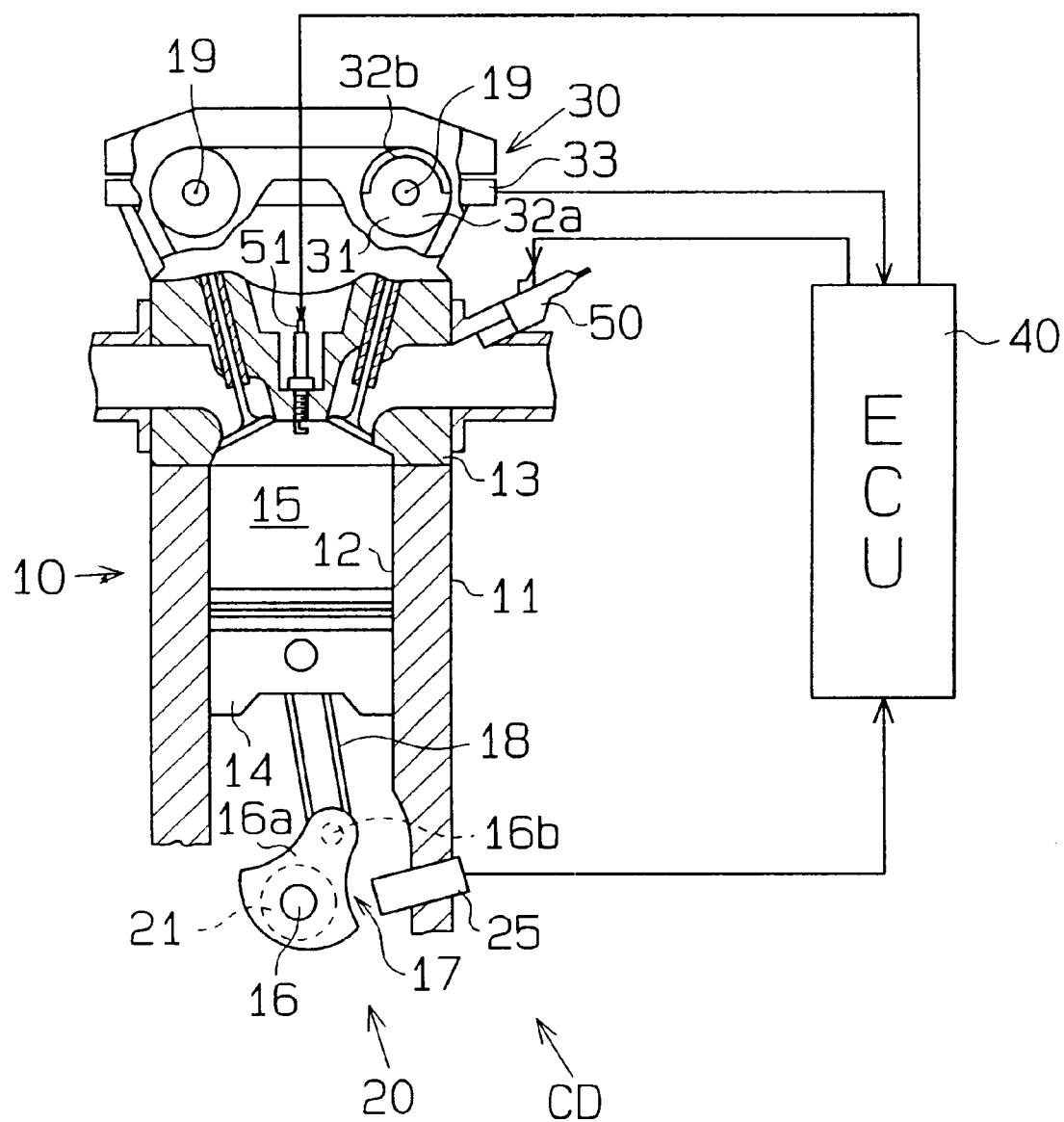
FIG. 1 is a schematic structural diagram of a crank angle detecting apparatus according to the first embodiment of this invention.

FIG. 1 shows a 4-cylinder gasoline engine system equipped with a crank angle detecting apparatus CD. An engine 10 comprises four cylinders formed in a cylinder block 11, pistons 14, which reciprocate vertically in the respective cylinders 12, and a crankshaft 16, which converts the reciprocation of each piston 14 to a rotary motion. The cylinders 12 include first to fourth cylinders #1 to #4 arranged in order. A combustion chamber 15 is defined by each cylinder 12, a cylinder head 13 and the top of the piston 14. Provided over the cylinder head 13 are two cam shafts 19 which are coupled to the crankshaft 16 via a timing belt (not shown). As the cam shafts 19 rotate 360°, the crankshaft 16 rotates 720°.

The crankshaft 16 has four cranks 17, one corresponding to each individual cylinder 12. Each crank 17 includes a pair of crank arms 16a secured to the crankshaft 16 and a crank pin 16b located between both crank arms 16a. The crank pin 16b is positioned eccentric to the rotational axis of the crankshaft 16. The cranks 17 corresponding to the first cylinder #1 and the fourth cylinder #4 differ from the cranks 17 corresponding to the second cylinder #2 and the third cylinder #3 in their positions in the rotational direction of the crankshaft 16. A crank angle (denoted by "° CA") is used to express the rotational position of the crankshaft 16 (i.e., the position of the piston 14 in each cylinder 12).

Each piston 14 is coupled to the crank pin 16b of the associated crank 17 via a connecting rod 18. The reciprocation of each piston 14 is converted to the rotary motion of the crankshaft 16 via the connecting rod 18. The engine 10 is assembled in such a way that when the crankshaft 16 comes to a specific reference rotational position (i.e., when the crank angle is 0° CA), the piston 14 in the first cylinder #1 comes to the top dead center in the compression stroke.

Injectors 50 and ignition plugs 51 are attached to the cylinder head 13 in association with the individual cylinders 12. Each injector 50 supplies fuel into the associated combustion chamber 15 when the associated crank 17 comes to a predetermined rotational position. Each ignition plug 51 ignites a fuel mixture in the associated combustion chamber 15 when the associated crank 17 comes to a predetermined rotational position.

A crank rotor 21 of a magnetic substance is fixed to the crankshaft 16. A magnetic sensor 25 of a semiconductor is attached to the cylinder block 11 so as to face the outer surface of the crank rotor 21. The crank rotor 21 and the magnetic sensor 25 constitute a crank position sensor 20.

Figure 3:
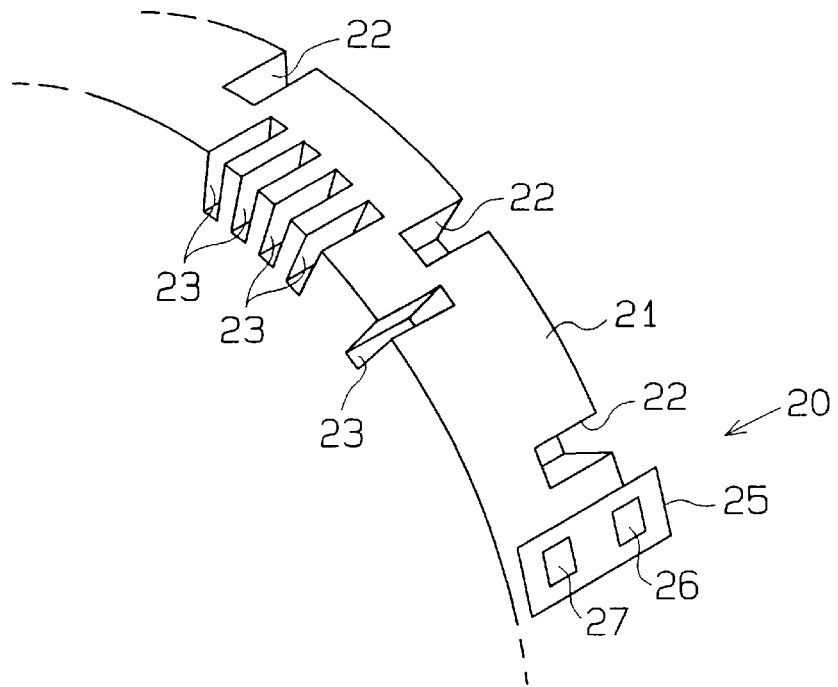
FIG. 3 is an enlarged view of the outer periphery of a crank rotor.
Figure 4:
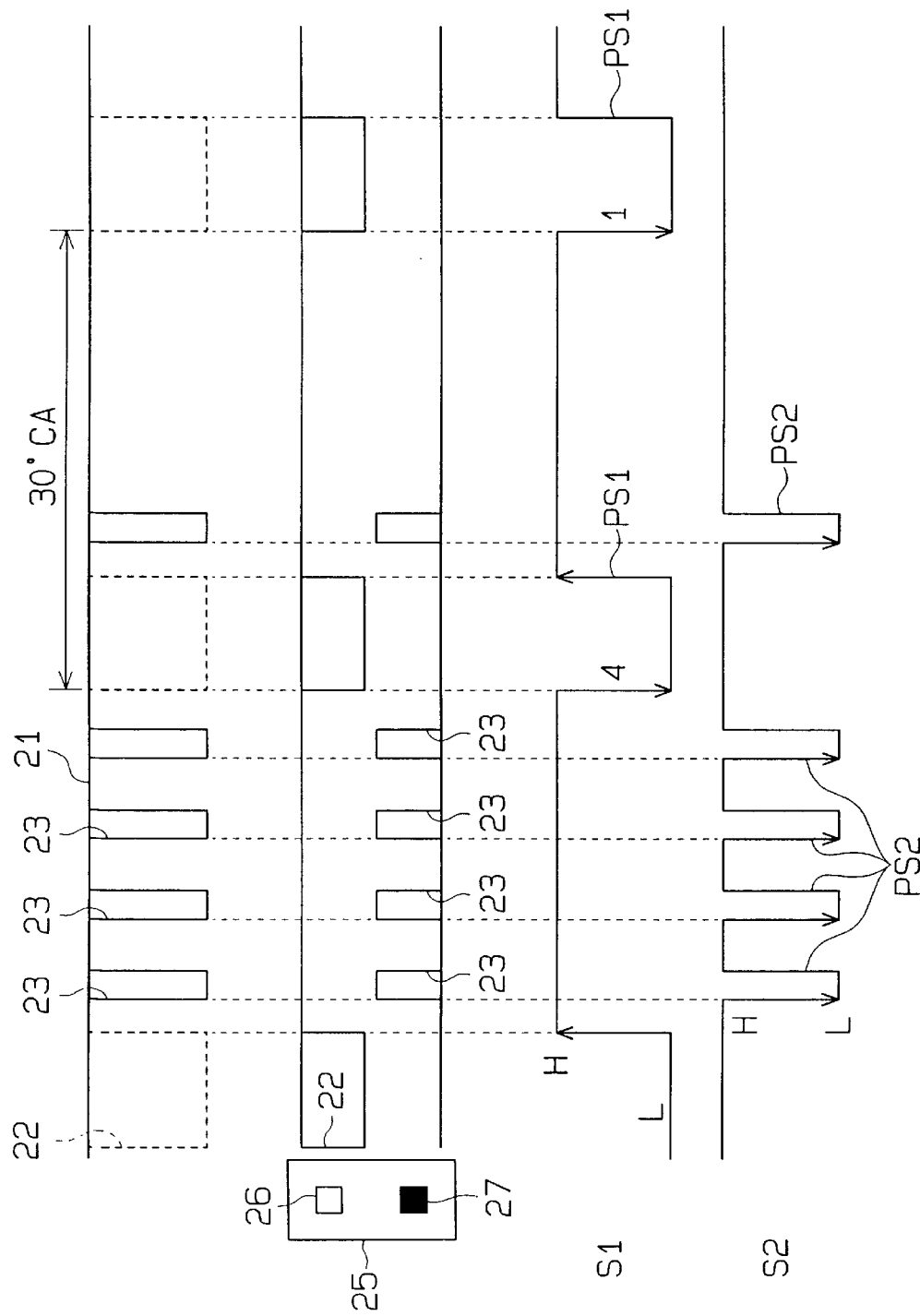
FIG. 4 is an explanatory diagram for explaining the operation of the crank position sensor.

This crank position sensor 20 will now be described specifically with reference to FIGS. 2, 3 and 4. The crank rotor 21 has a plurality of first grooves 22, or indicia, and a plurality of pulse signal second grooves 23, or indicia, on its periphery. The first grooves 22 are formed on one side of the crank rotor 21 periphery (the right side in FIG. 3), and the second grooves 23 are formed on the other side of the crank rotor 21 periphery (the left side in FIG. 3). The first grooves 22 are arranged at equal angular intervals (intervals of 30° CA in this embodiment). The second grooves 23 are located in segments G, each segment being located between two adjacent first grooves 22. The number of the second grooves 23 provided in each segment G is any one of zero to four. The number of the second grooves 23 in one segment G differs from the number of the second grooves 23 in the adjoining segment G. What is more, the combination of the numbers of the second grooves 23 provided in two adjacent segments G differs from the combination of the numbers of the second grooves 23 provided in any other two adjacent segments G.

The magnetic sensor 25 has a first detecting section 26, which faces the first grooves 22, and a second detecting section 27, which faces the second grooves 23. The detecting sections 26 and 27 are each formed of a semiconductor device, such as a Hall element or a magneto-resistive element. When any first groove 22 passes in front of the first detecting section 26 as the crank rotor 21 rotates, the first detecting section 26 outputs a low level first detection signal S1. When any first groove 22 is away from the first detecting section 26, the first detecting section 26 outputs a high level first detection signal S1. Likewise, when any second groove 23 passes in front of the second detecting section 27 as the crank rotor 21 rotates, the second detecting section 27 outputs a low level second detection signal S2. When any second groove 23 is away from the second detecting section 27, the second detecting section 27 outputs a high level second detection signal S2. In other words, the first and second detecting sections 26 and 27 output low-level pulse signals when respectively detecting the first and second grooves 22 and 23. Hereinafter, the low-level pulse signal associated with the first detection signal S1 output from the first detecting section 26 is called "first pulse signal PS1", and the low-level pulse signal associated with the second detection signal S2 output from the second detecting section 27 is called "second pulse signal PS2".

As shown in FIG. 1, a cam rotor 31 of a magnetic substance is secured to one cam shaft 19. An electromagnetic pickup 33 is attached to the cylinder head 13 in such a way as to face the outer surface of the cam rotor 31. The cam rotor 31 and the pickup 33 constitute a cam position sensor 30.

Figure 5:
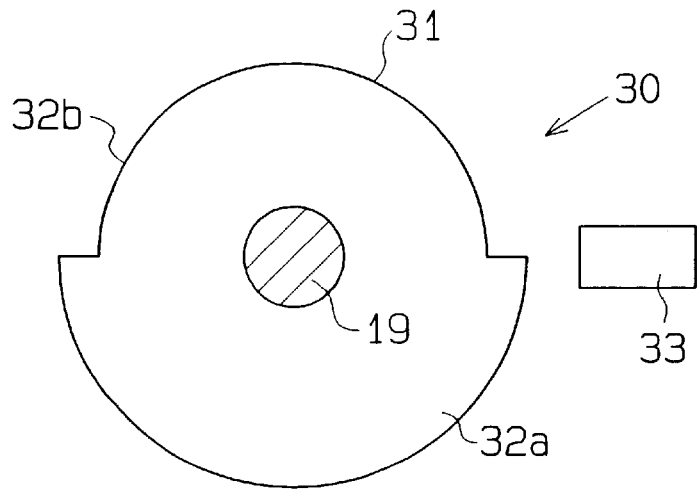
FIG. 5 is an explanatory diagram illustrating an exemplary cam position sensor.
Figure 10:
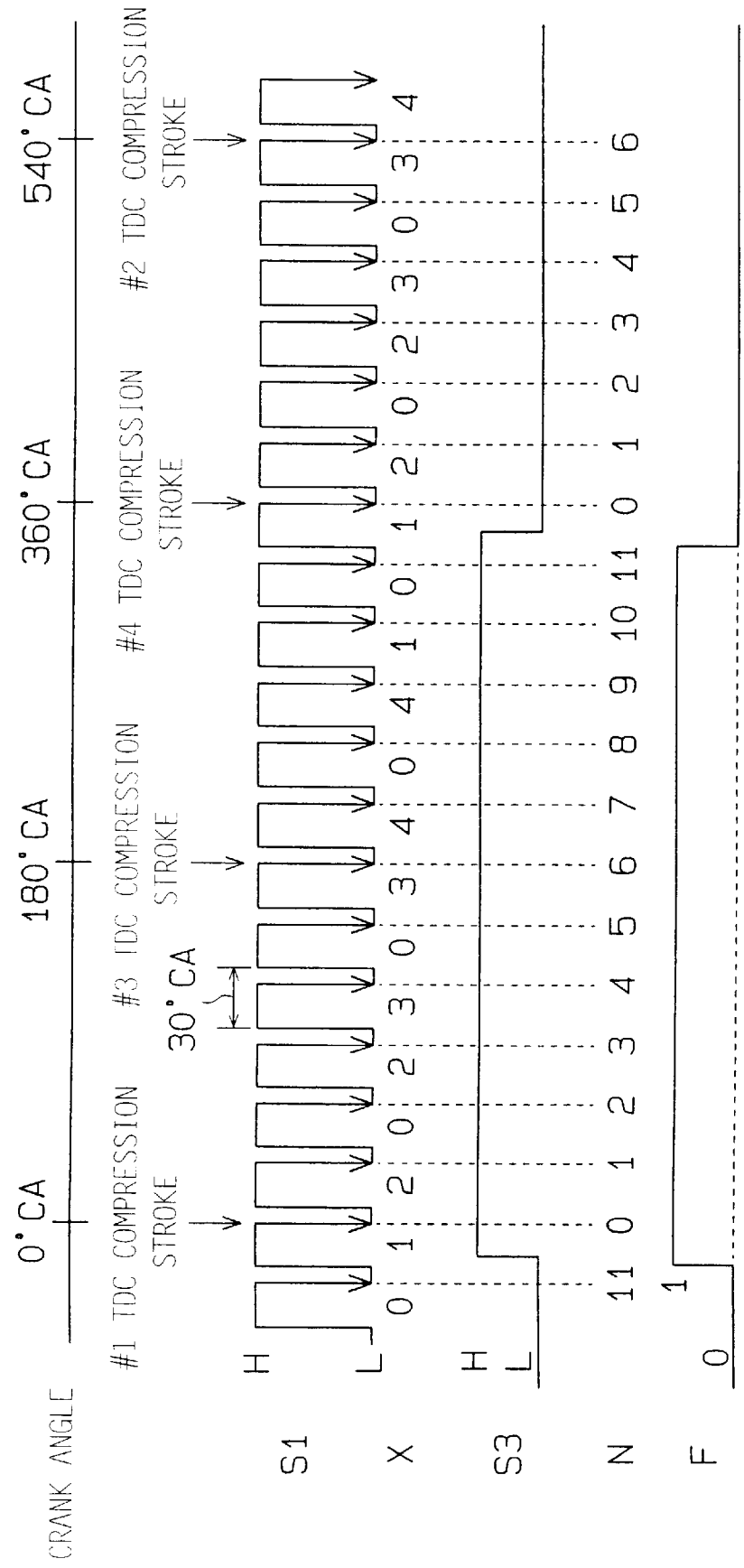
FIG. 10 is a timing chart for explaining the process of detecting a crank angle.

This cam position sensor 30 will now be described in detail with reference to FIG. 5. The cam rotor 31 has a large-diameter portion 32a and a small-diameter portion 32b. The large-diameter portion 32a and the small-diameter portion 32b serving as indicia and are each formed over a half (the range of 180°) of the cam rotor 31. When the large-diameter portion 32a passes in front of the pickup 33 in accordance with the rotation of the cam rotor 31, as shown in FIG. 10, the pickup 33 outputs a high-level third detection signal S3. When the small-diameter portion 32b passes in front of the pickup 33 in accordance with the rotation of the cam rotor 31, the pickup 33 outputs a low level third detection signal S3. Every time the cam rotor 31 and the cam shaft 19 turn 180° (i.e., every time the crank rotor 21 and the crankshaft 16 turn 360° CA), the third detection signal S3 output from the pickup 33 changes its level from a high level to a low level or vice versa.

Figure 7:
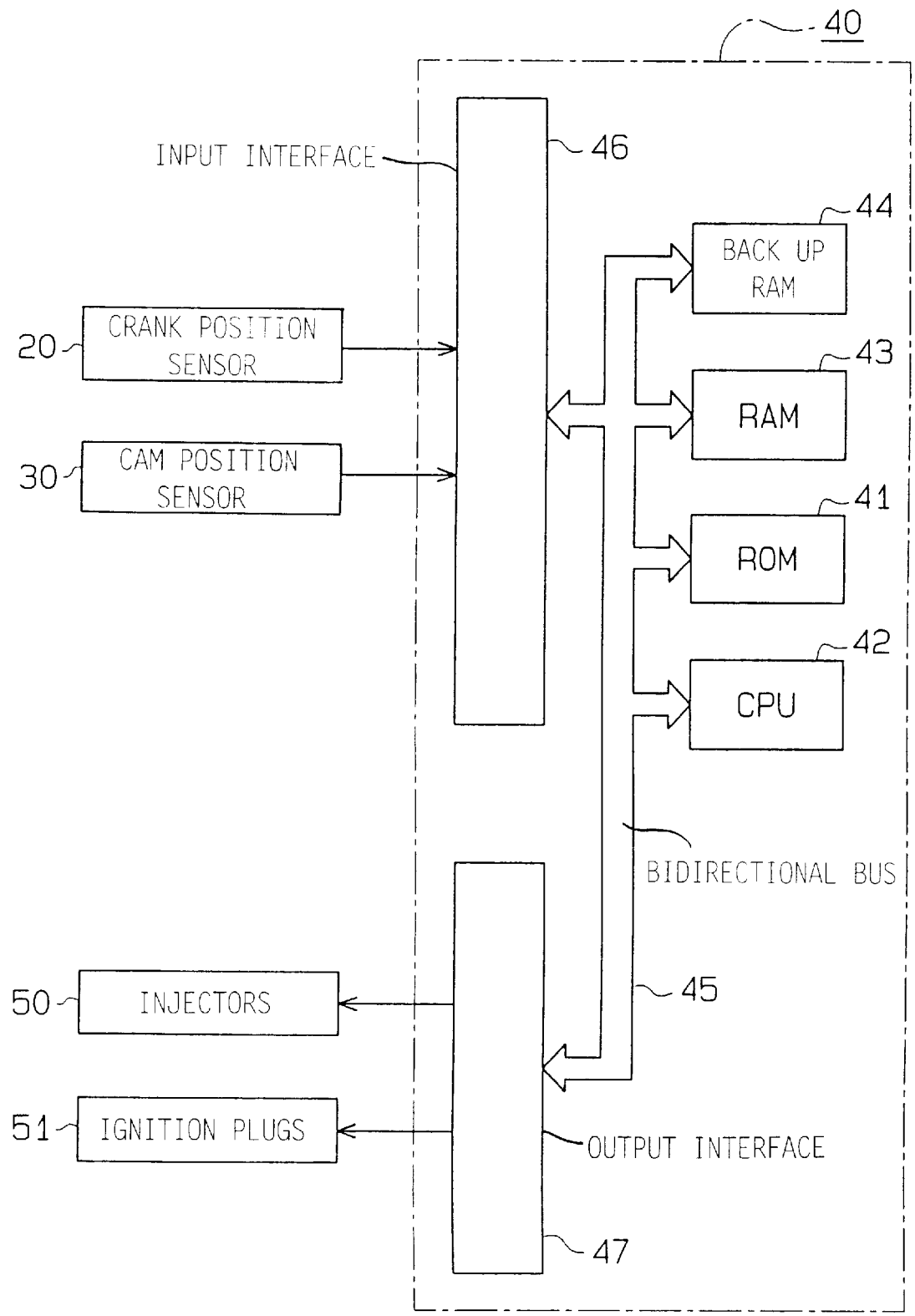
FIG. 7 is a block diagram showing the electric structure of an ECU.

The electric structure of the crank angle detecting apparatus CD will be discussed below referring to FIG. 7. The detecting apparatus CD includes an electronic control unit (ECU) 40. While the engine 10 is operating and during a predetermined time after the engine 10 is stopped, power is supplied to the ECU 40.

The ECU 40 has a ROM 41, a CPU 42, a RAM 43 and a backup RAM 44. Stored in the ROM 41 are, among other things, various kinds of programs necessary to control the operation of the engine 10. Included is a program for detection of a crank angle, table data shown in FIG. 8 used for execution of the program, a program for controlling the fuel injection timing and a program for controlling the ignition timing. The details of the table data in FIG. 8 will be discussed later. The CPU 42 executes arithmetic operations based on the programs in the ROM 41. The RAM 43 temporarily stores operational results obtained by the CPU 42, and data or the like input from the sensors 20, 30, etc. The backup RAM 44 holds data in the RAM 43 even when the power supply to the ECU 40 is inhibited.

A bidirectional bus 45 connects the CPU 42, the ROM 41, the RAM 43 and the backup RAM 44 together. An input interface 46 and an output interface 47 are connected to the bidirectional bus 45. A plurality of sensors including the crank position sensor 20 and the cam position sensor 30 are connected to the input interface 46. When the input signal from each sensor is an analog signal, this analog signal is converted by an A/D converter (not shown) to a digital signal, which is then sent to the bidirectional bus 45. Connected to the output interface 47 are a plurality of external devices including the injectors 50 and the ignition plugs 51. The operations of those external devices are controlled on the basis of the operational results obtained by the CPU 42.

Figure 6:
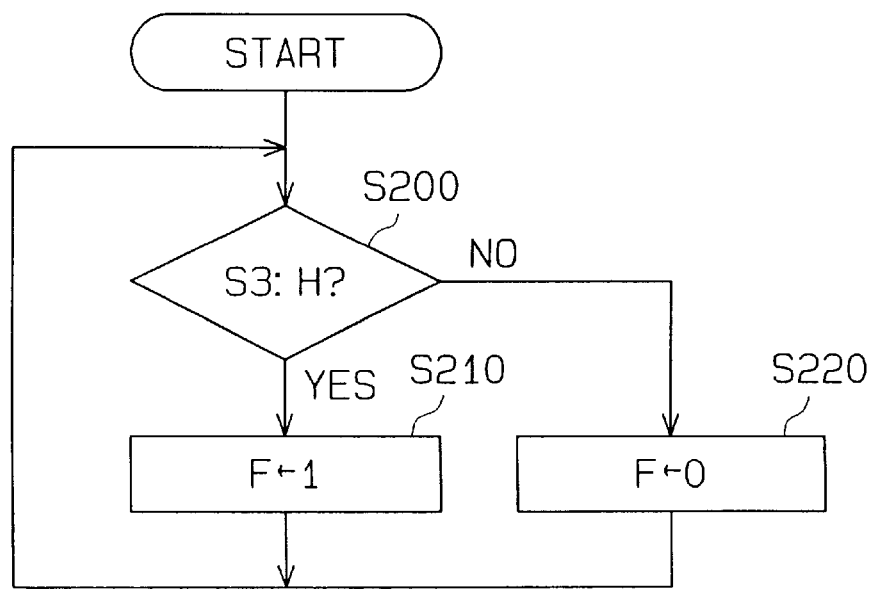
FIG. 6 is a flowchart illustrating a routine for setting a flag value.

The crank angle detecting program, which is executed by the ECU 40, will be described below with reference to the flowchart illustrated in FIG. 9, the flowchart depicted in FIG. 6 and the timing chart shown in FIG. 10.

Figure 9:
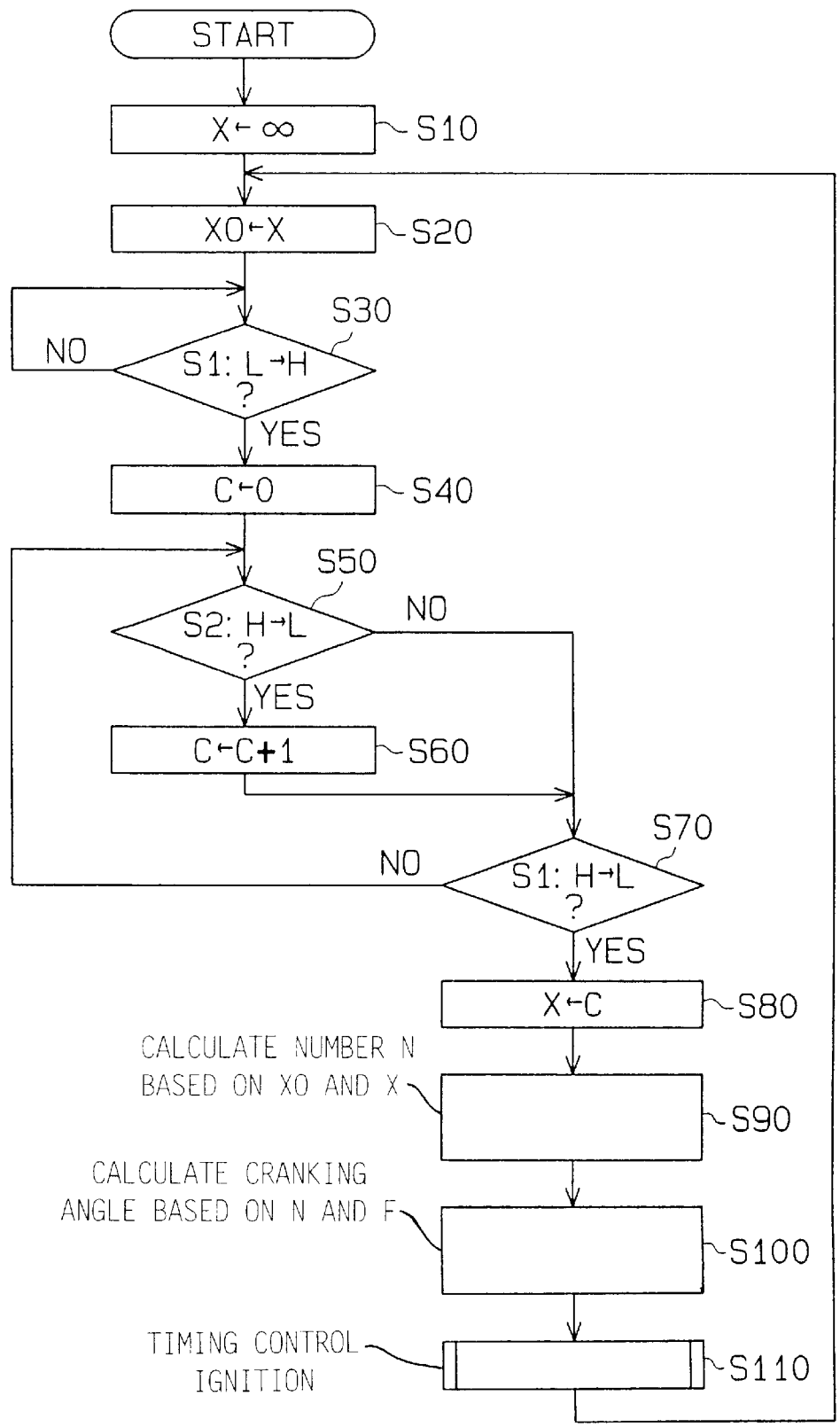
FIG. 9 is a flowchart illustrating a routine for detecting a crank angle.

When cranking is carried out to start the engine 10, the ECU 40 stores any one of integers "0" to "4" as the number, X, of the second pulse signals PS2 in the RAM 43 in step 10 as shown in FIG. 9. The process in this step 10 is executed only once when the engine 10 is started.

In step 20, the ECU 40 stores the number X of the second pulse signals PS2 in the RAM 43 as the previous number, X0, of the second pulse signals PS2. In the next step 30, the ECU 40 waits for the first detection signal S1 from the first detecting section 26 of the magnetic sensor 25 in the crank position sensor 20 to rise to a high level from a low level. That is, the ECU 40 determines if a first groove 22 of the crank rotor 21 has passed in front of the first detecting section 26. In other words, the ECU 40 determines if the first detecting section 26 has finished outputting the first pulse signal PS1.

When the first detection signal S1 rises to the high level from the low level, the ECU 40 proceeds to step 40. In step 40, the ECU 40 resets the count value, C, of the number X of the second pulse signals to "0". The CPU 42 has a function to count the number X of the second pulse signals, and the count value C is set in the CPU 42.

Next, counting the number X of the second pulse signals starts. Specifically, first, the ECU 40 determines in step 50 whether or not the second detection signal S2 from the second detecting section 27 of the magnetic sensor 25 has fallen to a low level from a high level. That is, the ECU 40 determines if the second detecting section 27 has sent out the second pulse signal PS2 as a result of the detection of a second groove 23 of the crank rotor 21.

When the second detection signal S2 has fallen to the low level from the high level, i.e., when the second detecting section 27 has output the second pulse signal PS2, the ECU 40 proceeds to step 60. In step 60, the ECU 40 increments the count value C by "1" after which the ECU 40 goes to step 70. When the second detection signal S2 has not fallen to the low level from the high level yet, on the other hand, the ECU 40 directly moves to step 70.

In step 70, the ECU 40 determines whether or not the first detection signal S1 from the first detecting section 26 has fallen to the low level from the high level. That is, the ECU 40 determines if a first groove 22 of the crank rotor 21 has reached a location in front of the first detecting section 26. In other words, the ECU 40 determines if the first detecting section 26 has output the first pulse signal PS1 as a result of the detection of a first groove 22. When the first detection signal S1 has not fallen to the low level from the high level yet, the ECU 40 returns to step 50 to repeat the sequence of processes in steps 50, 60 and 70.

As has been explained earlier with reference to FIGS. 2 and 3, the second grooves 23 on the crank rotor 21 are located on each segment G between two adjacent first grooves 22. Accordingly, as steps 30 to 70 are executed, the number of the second grooves 23 present between two adjacent first grooves 22 is counted.

When the first detection signal S1 has fallen to the low level from the high level in the step 70, the ECU 40 determines that the next first groove 22 has reached the first detecting section 26 and goes to step 80 to stop counting. In step 80, the ECU 40 stores the count value C as the number X of the second pulse signals in the RAM 43. This number X of the second pulse signals indicates the number of the second grooves 23 arranged in a segment G between two adjacent first grooves 22.

In the subsequent step 90, the ECU 40 acquires a number N to be assigned to each first pulse signal PS1 in the first detection signal S1 based on the number X of the second pulse signals and the previous number X0 of the second pulse signals, both in the RAM 43, and the table data in the ROM 41 illustrated in FIG. 8.

As mentioned above, the second grooves 23 are arranged in the segment G between two adjacent first grooves 22. The number of the second grooves 23 in one segment G differs from the number of the second grooves 23 in an adjoining segment G. What is more, the combination of the numbers of the second grooves 23 located in two adjacent segments G differs from the combination of the numbers of the second grooves 23 located in any other two adjacent segments G. Therefore, the previous number X0 of the second pulse signals differs from the current number X of the second pulse signals. Further, combinations of the previous number X0 of the second pulse signals and the current number X of the second pulse signals, obtained while the crank rotor 21 turns 360° CA, differ from one another.

The table data in the ROM 41 shown in FIG. 8 has a number N assigned to every combination of the previous number X0 of the second pulse signals and the current number X of the second pulse signals. There are a total of twelve combinations of the previous number X0 of the second pulse signals and the current number X of the second pulse signals. Those twelve combinations are arranged in the order that appears as the crank rotor 21 rotates, and numbers N from "0" to "11" are sequentially assigned to the combinations.

In the aforementioned step 90, therefore, the ECU 40 acquires the number N corresponding to the combination of the number X of the second pulse signals and the previous number X0 of the second pulse signals in the RAM 43, based on the table data in the ROM 41 shown in FIG. 8. Then, the ECU 40 gives the number N to the first pulse signal PS1 detected in the aforementioned step 70. In other words, based on the combination of the numbers of the second grooves 23 located in two adjacent, one leading and one lagging segments G a specific number N is assigned to the first groove 22 that is located at the trailing end of the lagging segment G.

As shown in the timing chart in FIG. 10, for example, when the previous number X0 of the second pulse signals is "0" and the current number X of the second pulse signals is "1", the number N of "0" is assigned to the first pulse signal PS1 corresponding to the time of the end of counting the current number X of the second pulse signals. If the segment G having a single second groove 23 follows the segment having no second groove 23, therefore, the number N of "0" is assigned to the first groove 22 positioned at the trailing end of the succeeding segment G. When the previous number X0 of the second pulse signals is "0" and the current number X of the second pulse signals is "2", by contrast, the number N of "3" is assigned to the first pulse signal PS1 corresponding to the time of ending the counting of the current number X of the second pulse signals. If the segment G having two second grooves 23 follows the segment having no second groove 23, therefore, the number N of "3" is assigned to the first groove 22 which is positioned at the trailing end of the lagging segment G.

Next, in step 100, the ECU 40 acquires a crank angle based on the number N obtained in step 90 and a flag value F set in the RAM 43. This flag value F is set in accordance with a change in the level of the third detection signal S3 from the pickup 33 of the cam position sensor 30. The flag F is sometimes referred to herein as a cycle progress signal.

A program for setting the flag value F, which is run by the ECU 40, will now be discussed with reference to the flowchart illustrated in FIG. 6. This flag value F setting program is executed in parallel to the crank angle detecting program.

First, in step 200, the ECU 40 determines if the third detection signal S3 from the pickup 33 of the cam position sensor 30 has a high level. When the third detection signal S3 has a high level, the ECU 40 sets the flag value F in the RAM 43 to "1" in step 210. When the third detection signal S3 does not have a high level (when it has a low level), the ECU 40 sets the flag value F in the RAM 43 to "0" in step 220. Every time the cam rotor 31 and the associated cam shaft 19 rotate 180° (i.e., every time the crank rotor 21 and the crankshaft 16 rotate 360° CA), the flag value F in the RAM 43 is changed to "0" from "1" or vice versa. This flag value F setting program is repeatedly run while the engine 10 is in operation.

As illustrated in the timing chart in FIG. 10, every time the crankshaft 16 turns 30° CA, the first pulse signal PS1 in the first detection signal S1 is output. In a period from the outputting of the first pulse signal PSI to the outputting of the next first pulse signal PS1, the number X of the second pulse signals is counted. Based on the combination of the adjacent numbers X of the second pulse signals, a specific number N is given to each first pulse signal PS1. Therefore, a crank angle in a period during which the crankshaft 16 makes one turn can be specified based on the number N.

As the crankshaft 16 makes two rotations, the engine completes one cycle including the suction stroke, compression stroke, combustion stroke and exhaust stroke. The same number N thus appears twice while the engine 10 accomplishes one cycle. As mentioned above, however, the flag value F is changed to "0" from "1" or vice versa every time the crankshaft 16 makes one turn. It is therefore possible to discriminate based on the flag value F whether the crankshaft 16 is at a rotational position between 0° CA and 360° CA or at a rotational position between 360° CA and 720° CA (=0° CA). Thus, a crank angle in a period during which the crankshaft 16 rotates from 0° CA to 720° CA can be specified based on the number N and the flag value F.

In FIG. 10, for example, when the flag value F is "1" and the number N is "0", the crank angle is specified as 0° CA. At this time, it is known that the piston 14 in the first cylinder #1 is at the top dead center in the compression stroke. When the flag value F is "0" and the number N is "0", by contrast, the crank angle is specified as 360° CA. At this time, it is known that the piston 14 in the fourth cylinder #4 is at the top dead center in the compression stroke. The discrimination of the cylinder 12 and the detection of the crank angle are carried out in this manner.

In step 110, the ECU 40 executes the ignition timing control based on the crank angle acquired in the step 100. Thereafter, the ECU 40 returns to step 20 to store the number X of the second pulse signals in the RAM 43 into the RAM 43 as the previous number X0 of the second pulse signals.

This crank angle detecting program is repeatedly executed while the engine 10 is running.

According to this embodiment, as specifically described above, every time the crankshaft 16 turns 30° CA, the first detecting section 26 of the magnetic sensor 25 detects one first groove 22 on the crank rotor 21. In a period from the detection of the first groove 22 to the detection of the next first groove 22, the number of the second grooves 23 on the crank rotor 21 is counted. In other words, the number of the second grooves 23 located in a segment G between two adjacent first grooves 22 is counted. Based on the combination of the numbers of the second grooves 23 located in two adjacent segments G, a specific number N is given to each first groove 22. The crank angle is detected based on the specific number N assigned to each first groove 22.

If the crankshaft 16 turns from the beginning of cranking by an amount that permits the counting of the number of the second grooves 23 in two adjacent segments G or by an amount that allows the detection of three first grooves 22, a crank angle can be detected. In other words, when the crankshaft 16 turns approximately 90° CA from the beginning of cranking, the crank angle can be detected accurately and the position of the piston 14 in each cylinder 12 can be discriminated precisely.

Based on the number N given to each first groove 22, a crank angle can be detected accurately every 30° CA. This widens the range of what can be controlled based on the crank angle. For instance, the ignition timing can be optimized. This improves the output characteristic of the engine 10 and suppresses the concentration or the like of NOx in the exhaust gas. Further, it is possible to accurately control the fuel injection timing in a system that independently performs fuel injection for each cylinder 12, or a system that performs fuel injection group by group for a plurality of cylinders 12 separated into two or three groups.

The second embodiment of this invention will be described below with reference to FIGS. 11 through 22.

An engine 61 in this embodiment has a mechanism for adjusting the rotational phase position of an intake-side cam shaft 74 with respect to a crankshaft 67. The structures of a crank position sensor 103 and a cam position sensor 109 differ from those of the first embodiment. Accordingly, this embodiment differs from the first embodiment in how the crank angle is determined. The second embodiment will be described below by referring mainly to the differences.

Figure 11:
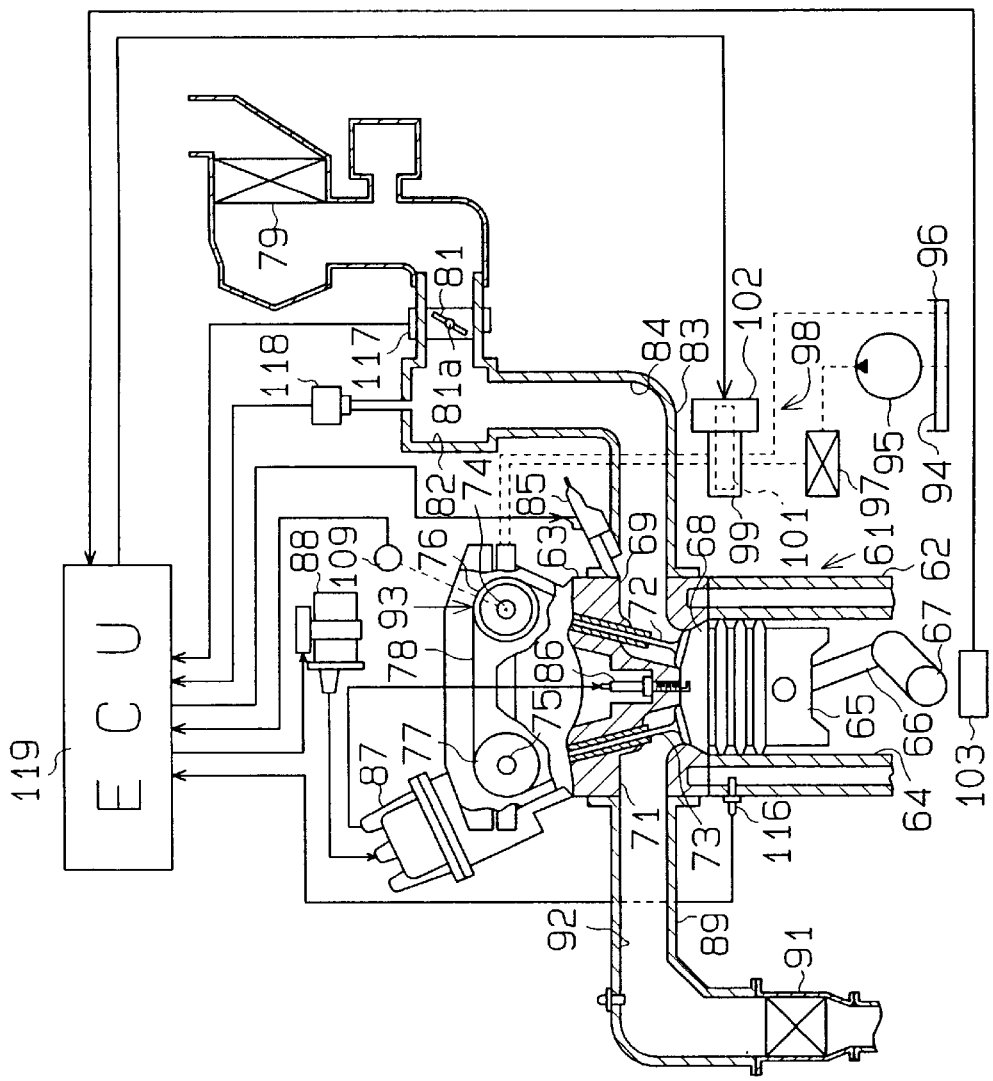
FIG. 11 is a schematic structural diagram of a crank angle detecting apparatus according to the second embodiment of this invention.

As shown in FIG. 11, a 4-cylinder gasoline engine 61 is installed on a vehicle. A plurality of cylinders 64 are provided side by side in a cylinder block 62 of the engine 61, with a piston 65 retained in each cylinder 64 in a reciprocatable manner. Each piston 65 is coupled to a crankshaft 67 via a connecting rod 66. The reciprocation of each piston 65 is converted to the rotary motion of the crankshaft 67 by the connecting rod 66.

A combustion chamber 68 is formed above each piston 65 between the cylinder block 62 and a cylinder head 63. The cylinder head 63 is provided with intake ports 69 and exhaust ports 71, which communicate with the respective combustion chambers 68. Intake valves 72 and exhaust valves 73 are reciprocatably supported in the cylinder head 63 in correspondence with the respective cylinders 64. The intake-side cam shaft 74 having a cam is rotatably supported on the cylinder head 63 above the intake valves 72. An exhaust-side cam shaft 75 having a cam is rotatably supported on the cylinder head 63 above the exhaust valves 73.

Timing pulleys 76 and 77, respectively provided at the ends of the cam shafts 74 and 75, are coupled to the crankshaft 67 by a timing belt 78. This belt 78 transmits the rotation of the crankshaft 67 to both timing pulleys 76 and 77. This transmission of the rotation allows both cam shafts 74 and 75 to rotate one turn while the crankshaft 67 makes two turns. As both cam shafts 74 and 75 rotate, their cams cause the valves 72 and 73 to reciprocate, so that the ports 69 and 71 are opened and closed by the valves 72 and 73.

An intake passage 84 equipped with, among other things, an air cleaner 79, a throttle valve 81, a surge tank 82 and an intake manifold 83 is connected to each intake port 69. Air outside the engine 61 is supplied into each combustion chamber 68 after passing the individual members 79, 81, 82 and 83 in the intake passage 84 in this order.

The throttle valve 81 is rotatably supported by a shaft 81a in the intake passage 84. The shaft 81a, coupled to an acceleration pedal (not shown) at the driver's seat via a wire or the like, rotates together with the throttle valve 81 in responsive to the thrust-down manipulation of the acceleration pedal by a driver. The amount of air flowing in the intake passage 84 (the amount of intake air) is determined in accordance with the rotational angle of the throttle valve 81.

An injector 85 having a solenoid coil is attached to the intake manifold 83. As the solenoid coil of each injector 85 is excited, this injector 85 is opened to inject fuel toward the associated intake port 69. A mixture of fuel to be injected from each injector 85 and intake air is supplied into each associated combustion chamber 68. To ignite this air-fuel mixture, ignition plugs 86 are attached to the cylinder head 63. The ignition plugs 86 are driven based on an ignition signal distributed by a distributor 87. The distributor 87 distributes and applies a high voltage output from an igniter 88 to the ignition plugs 86 in synchronism with the rotational position (crank angle) of the crankshaft 67. The air-fuel mixture supplied to each combustion chamber 68 is burned by the ignition from the associated ignition plug 86. A resulting high-temperature combustion gas causes each piston 65 to reciprocate, rotating the crankshaft 67 so that drive power of the engine 61 is acquired.

An exhaust passage 92 equipped with, among other things, an exhaust manifold 89 and a catalytic converter 91 is connected to each exhaust port 71. The combustion gas produced in each combustion chamber 68 is discharged from the engine 61 after passing the individual members 89, 91 in the exhaust passage 92 in this order.

In this engine 61, each piston 65 reciprocates twice and the crankshaft 67 rotates twice in a period from the supply of the air-fuel mixture into the associated combustion chamber 68 to the discharge of the combustion gas, or in one cycle. This cycle consists of four strokes: suction stroke, compression stroke, combustion stroke and exhaust stroke. In the suction stroke, the lowering of the piston 65 generates a negative pressure in the associated combustion chamber 68, which permits the air-fuel mixture to be supplied into the combustion chamber 68. In the compression stroke, the piston 65 moves upward to compress the air-fuel mixture. In the combustion stroke, the compressed air-fuel mixture is burned, generating pressure, which forces the piston 65 downward. In the exhaust stroke, the piston 65 pushed downward moves upward again, so that the combustion gas is discharged from the combustion chamber 68.

The four cylinders 64 of the engine 61 are referred to as the first cylinder #1, the second cylinder #2, the third cylinder #3 and the fourth cylinder #4 in the order of arrangement. The pistons 65 in the individual cylinders #1 to #4 reciprocate with the phase shifted by 180° CA in the order of the first cylinder #1, the third cylinder #3, the fourth cylinder #4 and the second cylinder #2.

A variable valve timing mechanism (VVT) 93 is provided in the rotation transmitting system which extends from the crankshaft 67 of the engine 61 to the intake-side cam shaft 74. The VVT 93 changes the rotational phase of the intake-side cam shaft 74 with respect to the crankshaft 67 in order to alter the actuation timings of the intake valves 72 with respect to the crank angle. The VVT 93 improves the fuel mileage, the torque characteristics and suppresses emissions. This VVT 93 has a movable piston, which is driven by the pressure of the engine oil 94. The VVT 93 further has a member that includes the intake-side timing pulley 76 and is driven by the timing belt 78 and a member secured to the intake-side cam shaft 74. The movable piston, which has a helical spline, is provided between both members. As this movable piston is moved in the axial direction by the hydraulic oil pressure, the phases of both members are shifted to continuously alter the actuation timings of the intake valves 72.

The engine oil 94 is retained in an oil pan 96. An oil pump 95 is drivably coupled to the crankshaft 67 to supply the engine oil 94 to the VVT 93 from the oil pan 96. As the engine 61 runs, the pump 95 pumps up the engine oil 94 from the oil pan 96 and expels it toward the VVT 93. Foreign matter, such as metal powder, in the engine oil 94 expelled from the pump 95 is caught by an oil filter 97.

An oil control valve (OCV) 98 adjusts the amount of the engine oil 94 (or the oil pressure) to be supplied to the VVT 93. The OCV 98 has a casing 99 having a plurality of ports, a spool valve 101 accommodated in the casing 99 and an electromagnetic solenoid 102, which causes the valve 101 to reciprocate to regulate the amount of the opening of each port. As the current to be supplied to the electromagnetic solenoid 102 is subjected to duty ratio control, the spool valve 101 is moved to an arbitrary position in the casing 99 to regulate the amount of the opening of each port. Consequently, the oil pressure of the VVT 93 is adjusted. In accordance with this oil pressure, the rotational phase of the intake-side cam shaft 74 is altered to change the actuation timing of the intake valves 72.

The engine 61 is provided with various sensors, such as the crank position sensor 103, the cam position sensor 109, a coolant temperature sensor 116, a throttle sensor 117, and an intake pressure sensor 118.

Figure 12:
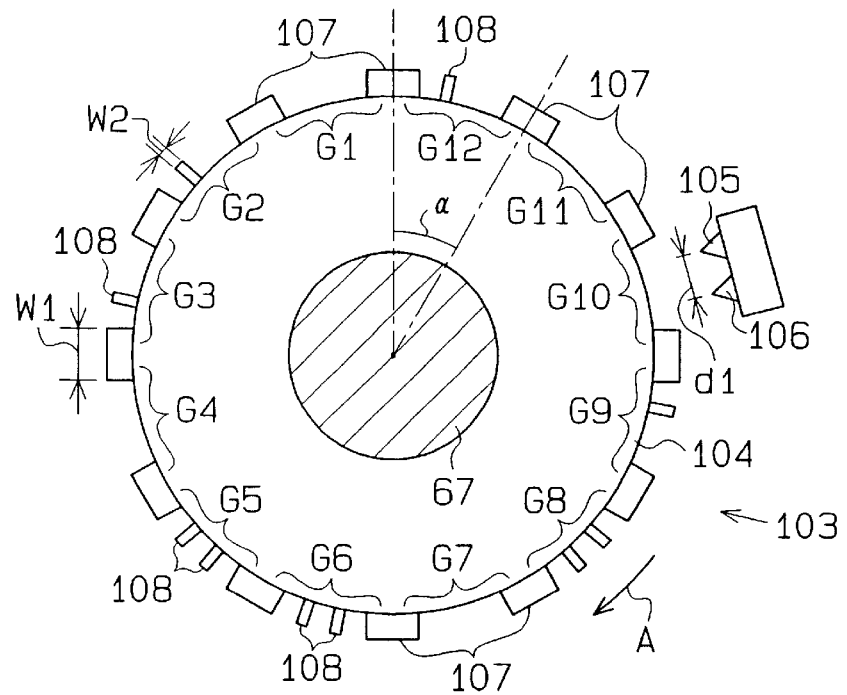
FIG. 12 is an explanatory diagram illustrating an exemplary crank position sensor.

The crank position sensor 103, as shown in FIG. 12, has a crank rotor 104, a first magnetic sensor 105 and a second magnetic sensor 106. The crank rotor 104 is a cast iron disc attached onto the crankshaft 67 to be rotatable together with the crankshaft 67. A plurality of first teeth 107, or indicia, are formed on the outer surface of the crank rotor 104 at equal angles α. In this embodiment, twelve first teeth 107 are formed at angles of 30°.

Second teeth 108, or indicia, are formed on the outer surface of the crank rotor 104 so as to be positioned in twelve segments G1 to G12, each lying between two adjacent first teeth 107. The number of the second teeth 108 in each of the segments G1–G12 is any one of 0, 1 and 2. The segments G1, G4, G7, G10 and G11 have no second teeth 108. Each of the segments G2, G3, G9 and G12 has a single second tooth 108. Each of the segments G5, G6 and G8 has two second teeth 108. Accordingly, the combination of the numbers of the second teeth 108 located in three adjacent segments G differs from the combination of the numbers of the second teeth 108 located in any other three adjacent segments G.

With respect to the rotational direction A of the crankshaft 67 and the crank rotor 104, the width w1 of each first tooth 107 is greater than the width w2 of each second tooth 108 (as measured in the tangential direction).

Both magnetic sensors 105 and 106 are so arranged as to face the outer surface of the crank rotor 104. The first magnetic sensor 105 is located upstream of the second magnetic sensor 106 with respect to the rotational direction A of the crank rotor 104. There is a predetermined distance d1 provided between the first magnetic sensor 105 and the second magnetic sensor 106. This distance d1 and the widths w1 and w2 have a relationship of w1>d1>w2. Each magnetic sensor 105 or 106 has a coil (not shown). When the positional relationship between each tooth 107 or 108 with respect to the individual magnetic sensors 105 and 106 changes as the crank rotor 104 rotates, the inductances of the coils vary.

Figure 20:
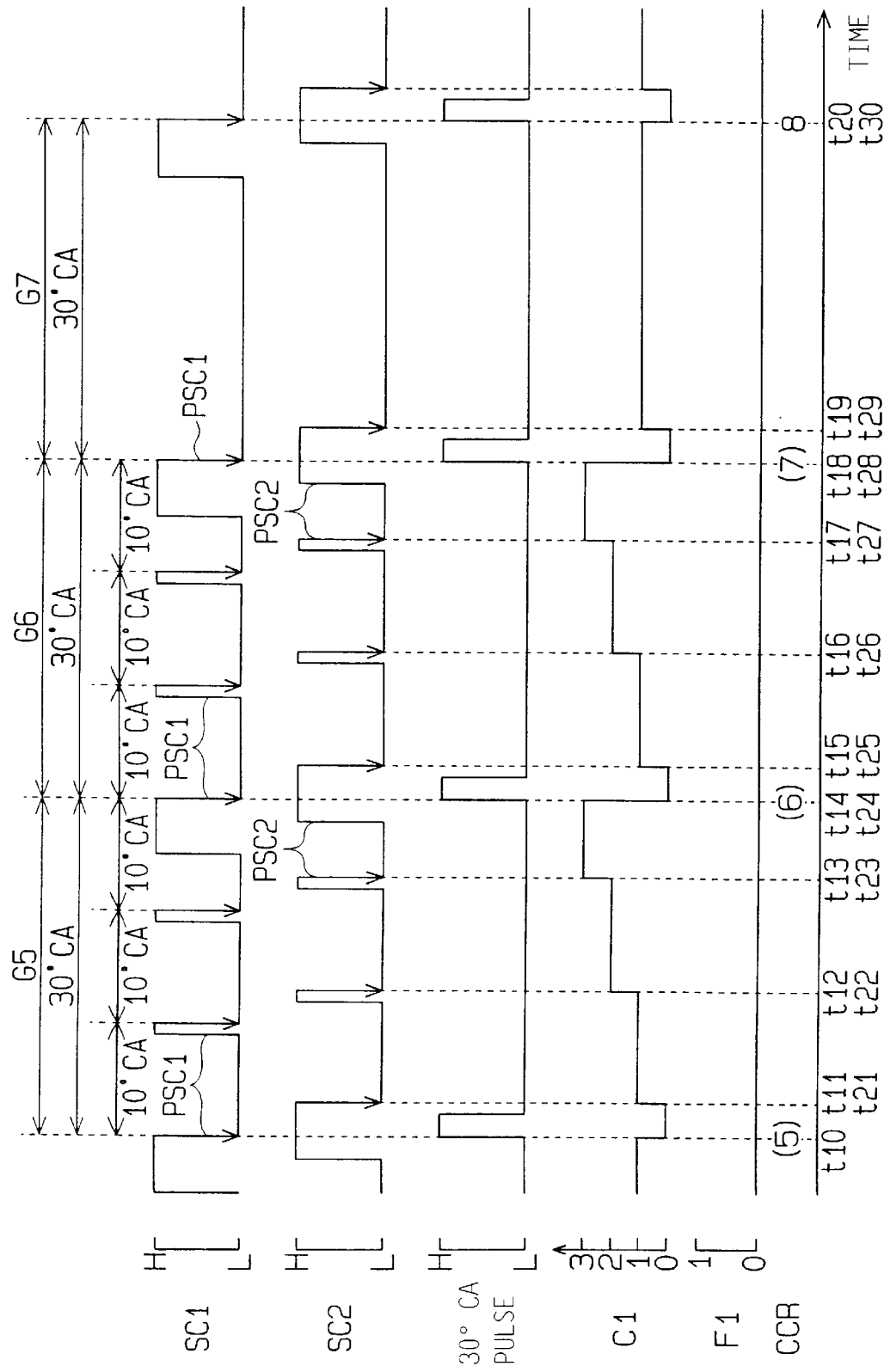
FIG. 20 is a timing chart showing changes in the count value, the flag value and a count value obtained by the crank counter with time.

When the first tooth 107 and the second tooth 108 pass in front of the first magnetic sensor 105 as the crank rotor 104 rotates, the first magnetic sensor 105 outputs a high-level first detection signal SC1. In other words, when detecting the first tooth 107 and the second tooth 108, the first magnetic sensor 105 outputs a high-level first pulse signal PSC1 associated with the first detection signal SC1. As shown in FIG. 20, the first magnetic sensor 105 outputs a wide first pulse signal PSC1 corresponding to the first tooth 107 every time the crankshaft 67 makes a turn of 30° CA. Further, the first magnetic sensor 105 outputs a narrow first pulse signal PSC1 corresponding to the second tooth 108 in the period between the outputting of one wide first pulse signal PSC1 to the next wide first pulse signal PSC1.

In accordance with the rotation of the crank rotor 104, the second magnetic sensor 106 outputs a second detection signal SC2 having the same waveform as that of the first detection signal SC1 output from the first magnetic sensor 105. That is, the second magnetic sensor 106 outputs a high-level second pulse signal PSC2 associated with the second detection signal SC2, when detecting the first tooth 107 and the second tooth 108. As shown in FIG. 20, the output timing for the second pulse signal PSC2 from the second magnetic sensor 106 is delayed from the output timing for the first pulse signal PSC1 from the first magnetic sensor 105 by a time equivalent to the distance d1 between both sensors 105 and 106.

Figure 13:
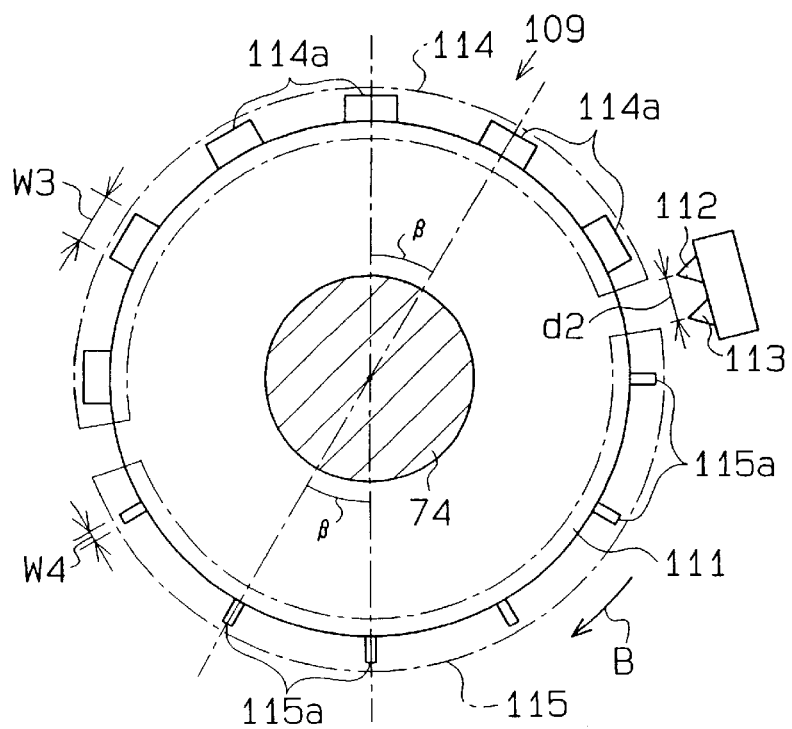
FIG. 13 is an explanatory diagram illustrating an exemplary cam position sensor.

The cam position sensor 109 has a cam rotor 111, a third magnetic sensor 112 and a fourth magnetic sensor 113, as shown in FIG. 13. The cam rotor 111 is a disc-shaped magnetic member attached onto the intake-side cam shaft 74, which is rotatable together with the cam shaft 74. A plurality of third teeth 114a, or indicia, are formed on the outer surface of the cam rotor 111 at equal angles β. In this embodiment, six third teeth 114a are formed at angles of 30°. A group 114 of the third teeth 114a is provided over nearly a half of the outer surface of the cam rotor 111 (over the range of 180°). A plurality of fourth teeth 115a, or indicia, are formed on the outer surface of the cam rotor 111 at equal angles β. In this embodiment, six fourth teeth 115a are formed at angles of 30°. A group 115 of the fourth teeth 115a is provided over nearly a half of the outer surface of the cam rotor 111 (over the range of 180°).

With respect to the rotational direction B of the intake-side cam shaft 74 and the cam rotor 111, the width w3 of each third tooth 114a is greater than the width w4 of each fourth tooth 115a. The width is measured in a direction that is tangential to the cam rotor 111, as shown in the drawings.

Both magnetic sensors 112 and 113, which have the same structures as the first and second magnetic sensors 105 and 106, are so arranged as to face the outer surface of the cam rotor 111. The third magnetic sensor 112 is located upstream of the fourth magnetic sensor 113 with respect to the rotational direction B of the cam rotor 111. There is a predetermined distance d2 provided between the third magnetic sensor 112 and the fourth magnetic sensor 113. This distance d2 and the widths w3 and w4 have a relationship of w3>d2>w4.

Figure 15:
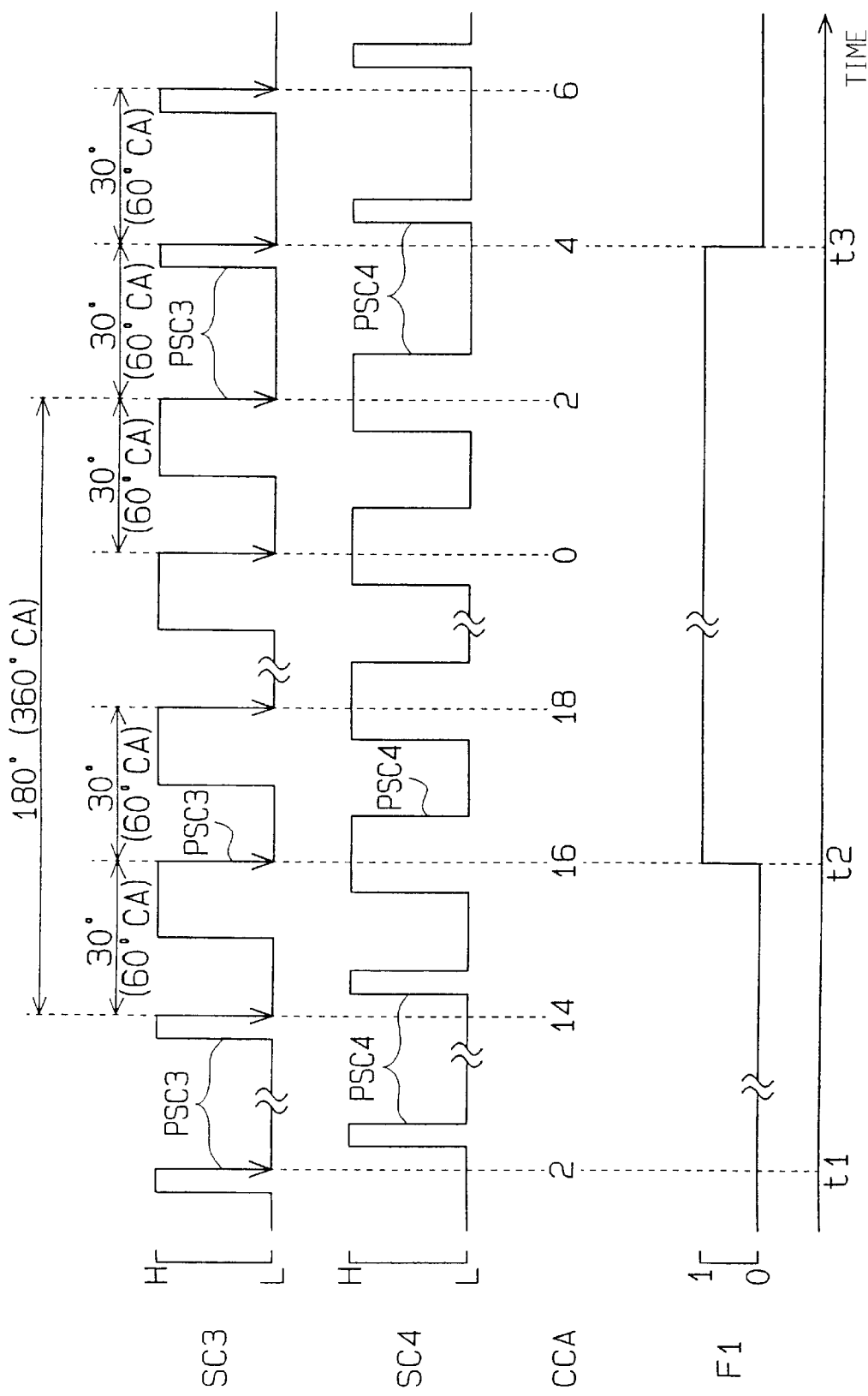
FIG. 15 is a timing chart showing changes in the count value obtained by the cam counter and the flag value with time.

When the third tooth 114a and the fourth tooth 115a pass in front of the third magnetic sensor 112 as the cam rotor 111 rotates, the third magnetic sensor 112 outputs a high-level third detection signal SC3. In other words, when detecting the third tooth 114a and the fourth tooth 115a, the third magnetic sensor 112 outputs a high-level third pulse signal PSC3 associated with the third detection signal SC3. As shown in FIG. 15, the third magnetic sensor 112 outputs a wide third pulse signal PSC3 corresponding to a third tooth 114a every time the intake-side cam shaft 74 makes a turn of 30° CA. Further, the third magnetic sensor 112 outputs a narrow third pulse signal PSC3 corresponding to a fourth tooth 115a every time the intake-side cam shaft 74 rotates by 30° CA.

In accordance with the rotation of the cam rotor 111, the fourth magnetic sensor 113 outputs a fourth detection signal SC4 having the same waveform as that of the third detection signal SC3 output from the third magnetic sensor 112. That is, the fourth magnetic sensor 113 outputs a high-level fourth pulse signal PSC4 associated with the fourth detection signal SC4, when detecting a third tooth 114a and a fourth tooth 115a. As shown in FIG. 15, the output timing for the fourth pulse signal PSC4 from the fourth magnetic sensor 113 is delayed from the output timing for the third pulse signal PSC3 from the third magnetic sensor 112 by a time that is a function of the distance d2 between both sensors 112 and 113.

As mentioned above, every time the intake-side cam shaft 74 rotates 180° (i.e., every time the crankshaft 67 rotates 360°), the third and fourth pulse signals PSC3 and PSC4 output from the third and fourth magnetic sensors 112 and 113 change to narrow from wide or vice versa.

As shown in FIG. 11, the coolant temperature sensor 116 is attached to the cylinder block 62 to detect the temperature of the coolant (coolant temperature THW) of the engine 61. The throttle sensor 117, attached near the throttle valve 81 in the intake passage 84, detects the rotational angle (throttle angle TA) of the shaft 81a of that valve 81. The intake pressure sensor 118, attached to the surge tank 82, detects the pressure in this tank 82 (intake pressure PM) with pressure in vacuum taken as a reference.

The signals from the aforementioned various kinds of sensors 103, 109, 116, 117 and 118 are input to an ECU 119, which has the same structure as the ECU 40 of the first embodiment. Based on those input signals, the ECU 119 computes, among other things, the engine speed NE and an angle of change θ. The ECU 119 also discriminates the cylinders 64 and detects the crank angle. The angle of change θ is the rotational angle of the intake-side cam shaft 74, which is altered by the VVT 93 to adjust the actuation timing of each intake valve 72.

The crank angle is expressed by a count value CCR obtained by a crank counter (not shown) equipped in the ECU 119. This count value CCR indicates the number of times the first teeth 107 pass in front of the first magnetic sensor 105 while the crankshaft 67 makes two turns from 0° CA to 720° CA, i.e., during one cycle of the engine 61. The count value CCR is set to any one of integer values "0" to "23" as shown in FIG. 21.

The discrimination of the cylinders 64 is executed when the count value CCR becomes a predetermined value. According to this embodiment, when the count value CCR is "0", it is determined that the piston 65 in the first cylinder #1 is at the top dead center (compression TDC) in the compression stroke. When the count value CCR is "6", it is determined that the piston 65 in the third cylinder #3 is at the top dead center in the compression stroke. When the count value CCR is "12", it is determined that the piston 65 in the fourth cylinder #4 is at the top dead center in the compression stroke. When the count value CCR is "18", it is determined that the piston 65 in the second cylinder #2 is at the top dead center in the compression stroke.

Based on those computed values, the ECU 119 operates the individual injectors 85, the igniter 88 and the OCV 98 to execute the fuel injection control, the ignition timing control, the valve timing control and so forth.

For instance, the ECU 119 computes the number of rotations of the crankshaft 67 per unit time or the engine speed NE based on the first detection signal SC1 or the second detection signal SC2 from the crank position sensor 103. Based on the detection signals SC1 or SC2 from the crank position sensor 103 and the detection signals SC3 or SC4 from the cam position sensor 109, the ECU 119 computes the rotational phase of the intake-side cam shaft 74 or the angle of change θ.

For the fuel injection control, the ECU 119 acquires the amount of intake air and then obtains the amount of fuel to be burned by that amount of air (fuel injection amount). The fuel injection amount is determined by the actuation time of the solenoid coil (not shown) of each injector 85. Based on the running conditions of the engine 61 at that time, therefore, the ECU 119 computes the actuation time TAU of each injector 85 as a parameter associated with the fuel injection amount. The ECU 119 energizes each solenoid coil over this time TAU to control the amount of fuel to be injected from the associated injector 85.

For the ignition timing control, data about the optimal ignition timings according to the running conditions of the engine 61 is pre-stored in the ROM in the ECU 119. The ECU 119 acquires the running conditions of the engine 61, such as the engine speed NE, the intake pressure PM and the warm-up state, from the detection signals from the individual sensors. The ECU 119 finds the optimal ignition timing by referring to the data in the ROM, and sends a signal to cut off the primary current to the igniter 88 to thereby control the ignition timing. Specifically, the ECU 119 controls the driving of the igniter 88 in such a way that ignition is performed on the first cylinder #1, the third cylinder #3, the fourth cylinder #4 and the second cylinder #2 every 180° CA in the named order.

For the valve timing control, the ECU 119 acquires the throttle angle TA based on the signal from the throttle sensor 117. Further, the ECU 119 acquires the engine speed NE and the angle of change θ based on the signals from the crank position sensor 103 and the cam position sensor 109. Using a previously prepared control map, the ECU 119 computes a target angle of change θVTA based on the throttle angle TA, the engine speed NE and so forth. Then, the ECU 119 controls the actuation time for the electromagnetic solenoid 102 of the OCV 98 in such a way that the angle of change θ matches with the target angle of change EVTA. This control adjusts the hydraulic pressure supplied to the VVT 93. As a result, the actuation timing of each intake valve 72 is altered in accordance with the running conditions of the engine 61.

Figure 14:
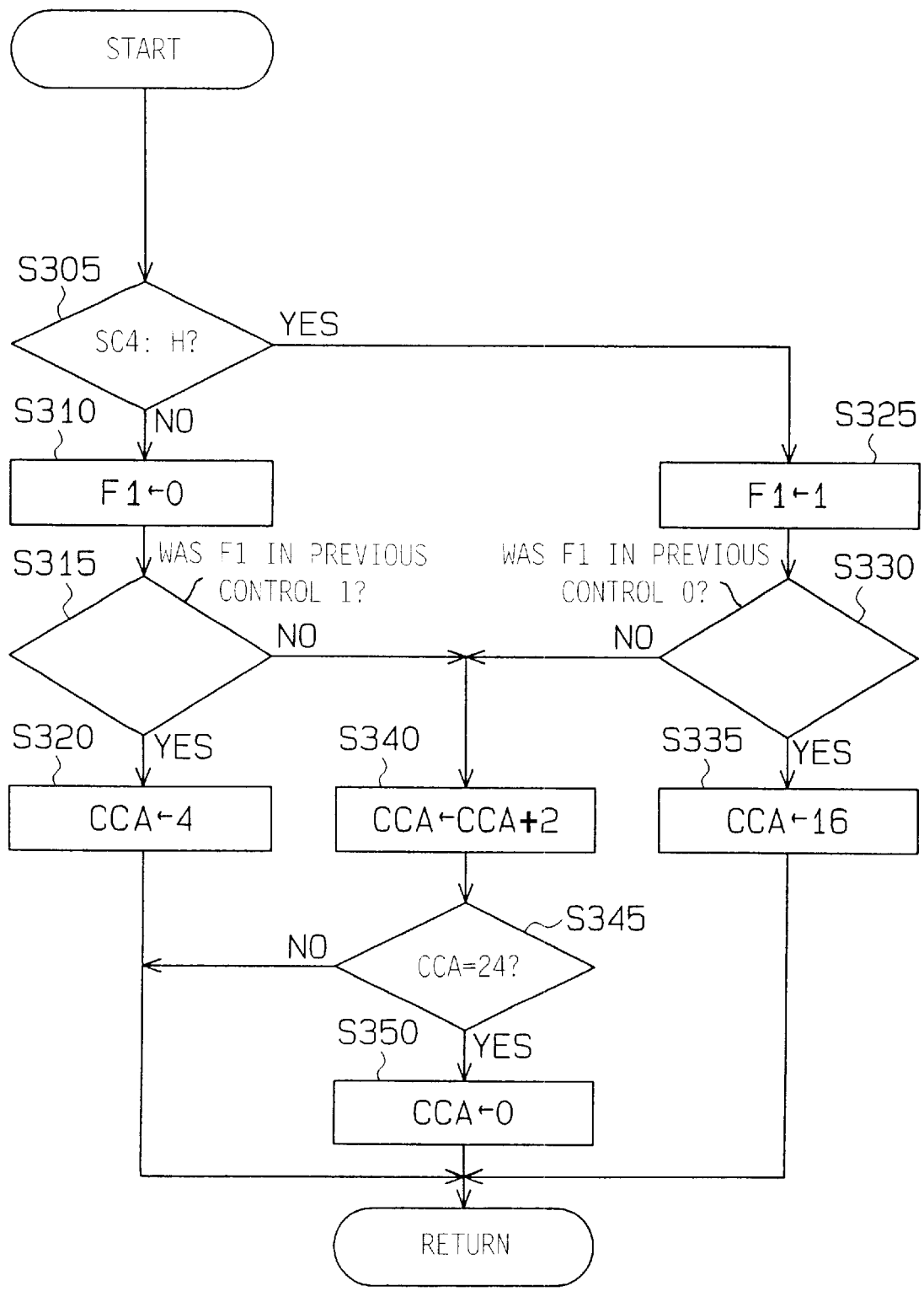
FIG. 14 is a flowchart illustrating a routine for setting a flag value and counting a count value by means of a cam counter.

The flowchart in FIG. 14 illustrates a routine for setting a flag value F1 and counting a count value CCA, which is executed by the ECU 119. This routine is performed every time the third detection signal SC3 falls to a low level from a high level or every time the cam rotor 111 turns 30° (every time the crankshaft 67 turns 60° CA).

While the engine 61 carries out one cycle, the crankshaft 67 makes two turns from 0° CA to 720° CA. The flag value F1 is used to determine whether the rotational position of the crankshaft 67 lies between 0° CA to 360° CA or lies between 360° CA to 720° CA, while the engine 61 carries out one cycle. When the fourth detection signal SC4 becomes high during the high-level duration of the third detection signal SC3, the ECU 119 determines that the rotational position of the crankshaft 67 lies between 0° CA to 360° CA and sets the flag value F1 to "1". In other words, when a leading third tooth 114a on the cam rotor 111 is passing in front of the magnetic sensors 112 and 113, the ECU 119 sets the flag value F1 to "1". When the fourth detection signal SC4 is low during the high-level duration of the third detection signal SC3, the ECU 119 determines that the rotational position of the crankshaft 67 lies between 360° CA to 720° CA and sets the flag value F1 to "0". In other words, when a leading fourth tooth 115a on the cam rotor 111 is passing in front of the magnetic sensors 112 and 113, the ECU 119 sets the flag value F1 to "0". Every time the cam rotor 111 rotates 180° CA (i.e., every time the crankshaft 67 rotates 360° CA), therefore, the flag value F1 is changed to "0" from "1" or vice versa.

The ECU 119 is equipped with a cam counter (not shown) for detecting the rotational position of the intake-side cam shaft 74. The cam counter increments the count value CCA by "2" every time the third pulse signal PSC3 is output from the third magnetic sensor 112. That is, the cam counter increments the count value CCA by "2" every time one of the third or fourth teeth 114a and 115a on the cam rotor 111 passes in front of the third magnetic sensor 112. The count value CCA is set to an even number in a range from "0" to "22" as shown in FIG. 21. The count value CCA is cleared to "0" when it reaches "24".

Note that the aforementioned flag value F1 and count value CCA are cleared to "0" by an initial routine (not illustrated), which is executed when the ignition key is turned on to start the engine.

When the routine illustrated in FIG. 14 is initiated in response to the falling of the third detection signal SC3, the ECU 119 first determines in step 305 if the fourth detection signal SC4 is at a high level. When the fourth detection signal SC4 is not at a high level, the ECU 119 determines that a fourth tooth 115a is passing in front of the third and fourth magnetic sensors 112 and 113 and sets the flag value F1 to "0" in step 310.

In the subsequent step 315, the ECU 119 determines if the flag value F1 in the previous control period has been "1". When the previous flag value F1 was "1", the ECU 119 determines that the tooth passing in front of both magnetic sensors 112 and 113 has been switched to a fourth tooth 115a from a third tooth 114a, and proceeds to step 320. After setting the count value CCA of the cam counter to "4" in step 320, the ECU 119 terminates this routine.

When the fourth detection signal SC4 has a high level in the aforementioned step 305, the ECU 119 determines that a third tooth 114a is passing in front of both magnetic sensors 112 and 113, and sets the flag value F1 to "1" in step 325. Next, the ECU 119 determines in step 330 if the flag value F1 in the previous control period was "0". When the previous flag value F1 was "0", the ECU 119 determines that the tooth passing in front of both magnetic sensors 112 and 113 has been switched to a third tooth 114a from a fourth tooth 115a, and moves to step 335. After setting the count value CCA of the cam counter to "16" in step 335, the ECU 119 terminates this routine.

When the conditions in the aforementioned step 315 or 330 are not satisfied, the ECU 119 determines that the flag value F1 in the current control period has not changed from that in the previous control period, and goes to step 340. In step 340, the ECU 119 increments the count value CCA of the cam counter by "2". In the next step 345, the ECU 119 determines if the count value CCA is "24". When the count value CCA is not "24", the ECU 119 terminates this routine directly. When the count value CCA is "24", the ECU 119 terminates this routine after resetting the count value CCA to "0" in step 350.

According to the above-discussed routine, the count value CCA of the cam counter and the flag value F1 changes as shown in FIG. 15, based on the third detection signal SC3 and the fourth detection signal SC4. The timing chart in FIG. 15 shows the engine 61 having started at time t1. At time t2, the tooth passing in front of both magnetic sensors 112 and 113 is switching to a third tooth 114a from a fourth tooth 115a. At time t3, the tooth passing in front of both magnetic sensors 112 and 113 is switching to a fourth tooth 115a from a third tooth 114a.

At time t1, the fourth detection signal SC4 is at a low level. At this time t1, the flag value F1 and the count value CCA are both set to "0" in the initial routine. At time t1, therefore, the routine shown in FIG. 14 is executed in the order of steps 305, 310, 315, 340 and 345. Consequently, the flag value F1 is set to "0" and the count value CCA is s et to "2".

At a later time than the time t1, the processes in steps 305, 310, 315, 340 and 345 are executed in response to the falling of the third detection signal SC3 until it is determined in step 305 that the fourth detection signal SC4 has a high level. Every time this routine is executed, therefore, the count value CCA is incremented by "2". During this period, the flag value F1 is held at "0".

At time t2, the fourth detection signal SC4 has a high level. At this time t2, the routine illustrated in FIG. 14 is executed in the order of steps 305, 325, 330 and 335. As a result, the flag value F1 is changed to "1" from "1" and the count value CCA is set to "16".

At a later time than the time t2, the processes in steps 305, 325, 330, 340 and 345 are executed in response to the falling of the third detection signal SC3. Every time this routine is executed, therefore, the count value CCA is incremented by "2". When the count value CCA reaches "24", the count value CCA is cleared to "0" in step 350. During this period, the flag value F1 is held at "1".

At time t3, the fourth detection signal SC4 has a low level. At this time t3, the routine illustrated in FIG. 14 is executed in the order of steps 305, 310, 315 and 320. As a result, the flag value F1 is changed to "0" from "1" and the count value CCA is set to "4".

At a later time than the time t2, the processes in steps 305, 310, 315, 340 and 345 are executed in response to the falling of the third detection signal SC3 until the fourth detection signal SC4 is determined to be a high level in step 305. Every time this routine is executed, therefore, the count value CCA is incremented by "2". During this period, the flag value F1 is held at "0".

In the routine shown in FIG. 14, as apparent from the above, the count value CCA of the cam counter is incremented by "2" in the range of "0" to "22" every time the third detection signal SC3 falls (i.e., every time the intake-side cam shaft 74 rotates 30°). Further, the count value CCA is set to "4" when the flag value F1 is changed to "0" from "1", and is set to "16" when the flag value F1 is changed to "1" from "0". Once the intake-side cam shaft 74 turns, after the first switching of the flag value F1 since the beginning of cranking, the rotational position of the intake-side cam shaft 74 can thereafter be detected accurately based on the count value CCA every time the shaft 74 makes a turn of 30°.

Figure 16:
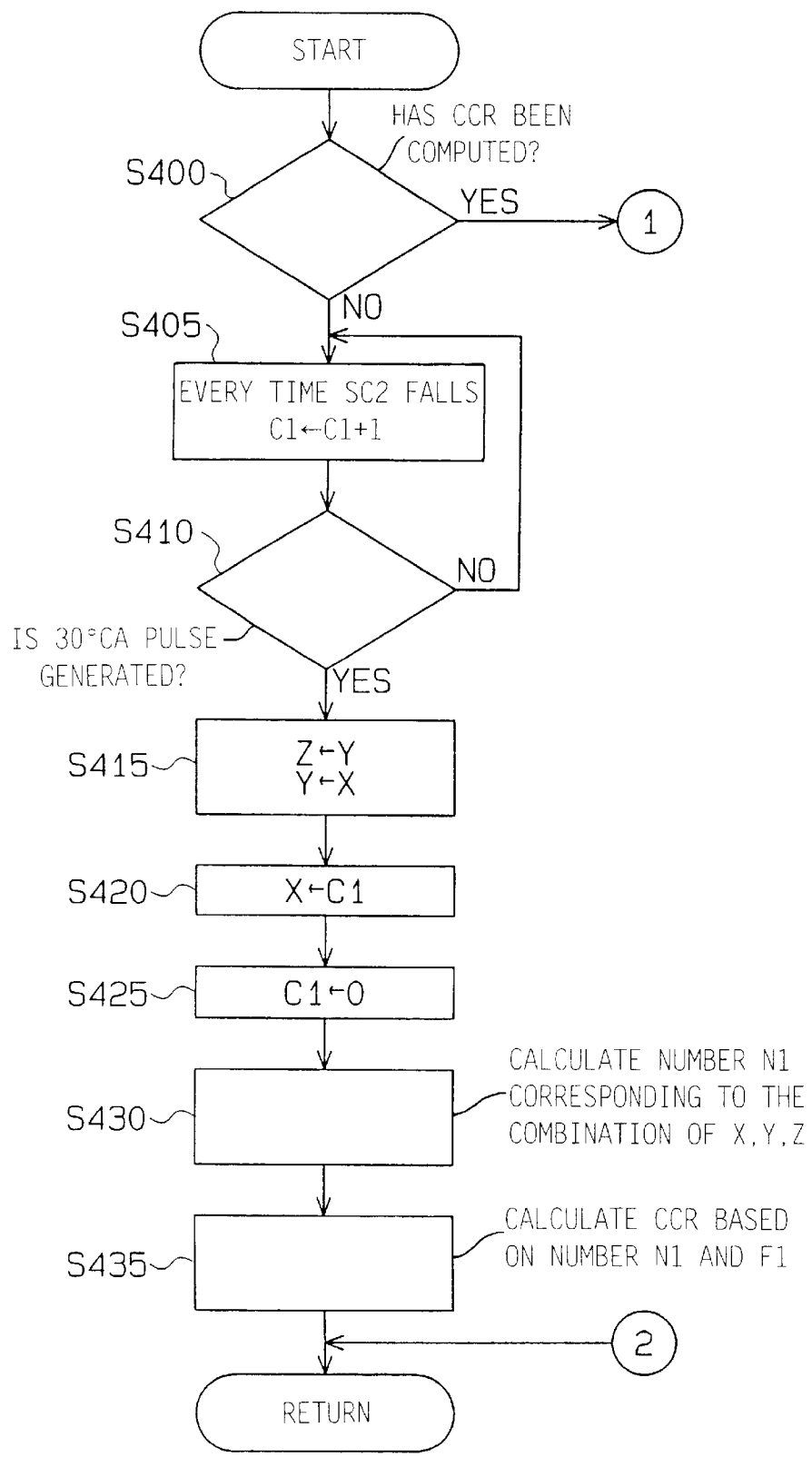
FIG. 16 is a flowchart illustrating a routine for counting a count value by means of a crank counter.
Figure 17:
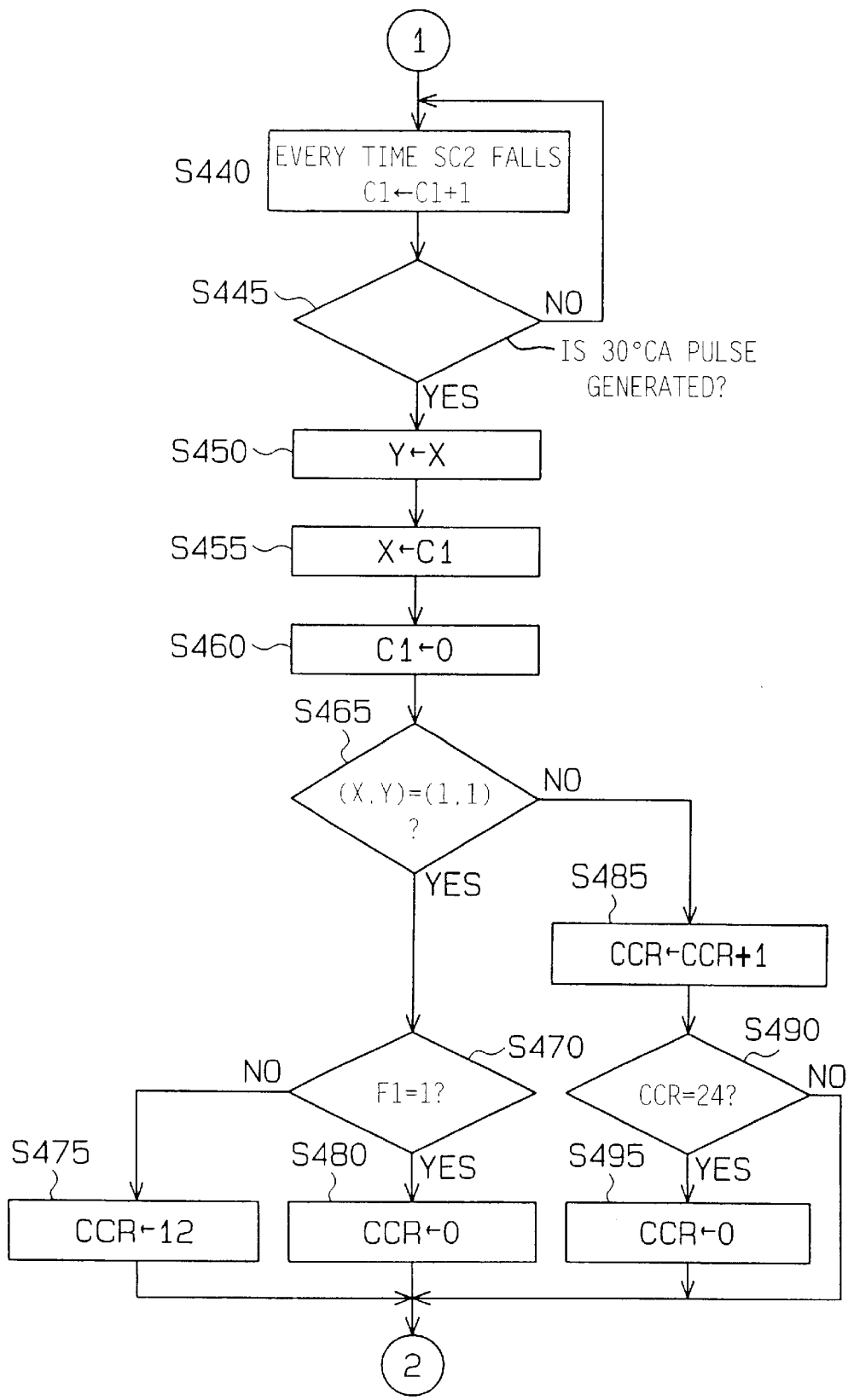
FIG. 17 is a flowchart illustrating a routine that follows the routine described in the flowchart in FIG. 16.

The flowcharts in FIGS. 16 and 17 illustrate a routine for counting a count value CCR, which is executed by the ECU 119. This count value CCR is used to detect the rotational position of the crankshaft 67. The count value CCR is incremented by "1" every time the crankshaft 67 turns by a predetermined angle (30° CA in this example). When the crankshaft 67 rotates twice, the count value CCR is cleared. Specifically, the count value CCR, the initial value of which is 0, is incremented by "1" every time the crankshaft 67 turns 30° CA. The count value CCR is cleared to "0" when it reaches 24.

For the operation of counting the count value CCR, the ECU 119 generates a 30° CA pulse every time the crankshaft 67 turns 30° CA. More specifically, as shown in FIG. 20, the ECU 119 generates the 30° CA pulse when the second detection signal SC2 is at a high level at the falling of the first detection signal SC1.

The individual processes in the routines in FIGS. 16 and 17 are executed based on a count value C1. The count value C1 is incremented by "1" in response to the falling of the second detection signal SC2 after the generation of the 30° CA pulse. This count value C1 is stored in the RAM in the ECU 119. The count value C1 is cleared to "0" when the next 30° CA pulse is generated.

According to this embodiment, every time the 30° CA pulse is generated, the count value C1 at that time is written in a first memory area X in the RAM. The value previously stored in the first memory area X is shifted to a second memory area Y in the RAM and is stored there. The value stored in the second memory area Y is shifted to, and stored in, a third memory area Z in the RAM. Arbitrary values (e.g., "∞") other than "1", "2" and "3" are stored in the first to third memory areas X, Y and Z in the initial routine (not shown), which is executed when the ignition key is turned on to start the engine. The routines in FIGS. 16 and 17 are initiated when the first 30° CA pulse is generated as the engine is started.

When the routine in FIG. 16 starts as the first 30° CA pulse is produced, the ECU 119 first determines in step 400 if the count value CCR has already been computed. If this condition is not met, the ECU 119 determines that the count value CCR has not been computed at all, because it is immediately after the activation of the engine 61, and executes the processes in subsequent steps 405 to 435 in order.

In step 405, the ECU 119 increments the count value C1 by "1" every time the second detection signal SC2 falls. In the next step 410, the ECU 119 determines if the 30° CA pulse has been generated. The ECU 119 repeats the process in step 405 until this condition is fulfilled. Until the next 30° CA pulse is generated, therefore, the count value C1 is increased by "1" every time the process in this step 405 is executed.

When the condition in step 410 is satisfied due to the generation of the 30° CA pulse, the ECU 119 shifts the values stored in the memory areas X and Y to the memory areas Y and Z respectively and stores the values there in step 415. In step 420, the ECU 119 stores the current count value C1 in the first memory area X. In the subsequent step 425, the ECU 119 clears the count value C1 to "0".

Subsequently, in step 430, the ECU 119 acquires a number N1 corresponding to the combination of the values in the three memory areas X, Y and Z based on a map stored in the ROM. As shown in FIG. 18, twelve combinations of the values stored in the three memory areas X, Y and Z are set on this map. Numbers N1 from "0" to "11" are sequentially assigned to the twelve combinations. For example, the number N1 corresponding to the combination of (X, Y, Z)=(1, 1, 2) is "0", and the number N1 corresponding to the combination of (X, Y, Z)=(2, 1, 1) is "1". Therefore, a specific number N1 is assigned to the first tooth 107 corresponding to the 30° CA pulse generated in step 410.

In the next step 435, the ECU 119 acquires the count value CCR corresponding to the number N1 and flag value F1 based on another map stored in the ROM. Set on this map are the count values CCR (0 to 3, 16 to 23) corresponding to the numbers N1 when the flag value F1 is "1" and the count values CCR (12 to 15, 4 to 11) corresponding to the numbers N1 when the flag value F1 is "0". The ECU 119 terminates this routine after executing the process in this step 435.

In the first control period immediately after the activation of the engine, values other than "1", "2" and "3" are stored in the memory areas Y and Z at the stage of the aforementioned step 430. It is not therefore possible to obtain the number N1 corresponding to the combination of the values in the three memory areas X, Y and Z from the map in FIG. 18. Accordingly, the count value CCR cannot also be obtained from the map in FIG. 19. Thus, the condition in step 400 is not met even in the second control period, and the processes in steps 405–435 are executed in order.

In this second control period, a value other than "1", "2" and "3" is stored in the third memory area Z at the stage of step 430. Therefore, the number N1 and the count value CCR cannot be obtained even in the second control period. In the third control period too, the condition in step 400 is not met and the processes in steps 405–435 are executed in order.

In this third control period, any one of the values "1", "2" and "3" is stored in all the memory areas X, Y and Z at the stage of step 430. The map in FIG. 18 has a number N1 corresponding to the combination of those values in the memory areas X, Y and Z. In the third control period, therefore, the number N1 and the count value CCR are acquired in steps 430 and 435. In the fourth control period, therefore, the condition in step 400 is satisfied.

When this condition in step 400 is met, the ECU 119 determines that the count value CCR has been acquired once and executes the processes in subsequent steps 440 to 495 in order.

In step 440, the ECU 119 increments the count value C1 by "1" every time the second detection signal SC2 falls. In the next step 445, the ECU 119 determines if the 30° CA pulse has been generated. The ECU 119 repeats the process in step 440 until this condition is met. Until the next 30° CA pulse is generated, therefore, the count value C1 is increased by "1" every time the process in this step 440 is executed.

When the condition in step 445 is satisfied as a result of the generation of the 30° CA pulse, the ECU 119 shifts the value stored in the first memory area X to the second memory area Y and stores it there in step 450. In step 455, the ECU 119 stores the current count value C1 in the first memory area X. In the subsequent step 460, the ECU 119 clears the count value C1 to "0".

In the next step 465, the ECU 119 determines if the values stored in the first and second memory areas X and Y are both "1". When this condition is fulfilled, the ECU 119 determines if the flag value F1 is "1" in step 470. When this condition is not satisfied, the ECU 119 sets the count value CCR to "12" in step 475 after which it terminates this routine. When the condition in step 470 is met, the ECU 119 sets the count value CCR to "0" in step 480 after which it terminates this routine.

When the condition in the aforementioned step 465 is not met, the ECU 119 increments the count value CCR by "1" in step 485. Next, the ECU 119 determines in step 490 if the count value CCR is "24". When this condition is not satisfied, the ECU 119 directly terminates this routine. When the condition in step 490 is met, the ECU 119 clears the count value CCR to "0" in step 495 and then terminates this routine.

According to this routine, the count value C1 and count value CCR vary as shown in FIG. 20 in association with the first detection signal SC1, the second detection signal SC2, the 30° CA pulse and the flag value F1. The timing chart in FIG. 20 exemplifies the case where, as the crank rotor 104 in FIG. 12 rotates, the first teeth 107 and second teeth 108, which correspond to three segments G5, G6 and G7, have passed in front of the magnetic sensors 105 and 106. Referring to this timing chart, a description will now be given of the operation when the engine 61 is started and the operation after a certain time passes from the activation of the engine 61. Times t21 to t30 are used to explain the operation when a certain time passes after the activation of the engine 61.

To begin with, the operation when the engine 61 is started will be discussed. Assuming that the engine 61 has been activated just before time t10, the routine in FIG. 16 is initiated when the first 30° CA pulse is generated at time t10. Since the count value CCR has not been obtained yet at this time t10, the condition in step 400 is not satisfied in the routine in FIG. 16, so that the processes in steps 405–435 are carried out. It is assumed that, in the period shown in this timing chart, the flag value F1 is set to "0" in the routine in FIG. 14.

In the period from the next time t11 to time t14, at which the 30° CA pulse is generated next, the process in step 405 is repeated. That is, the count value C1 is incremented by "1" every time the second detection signal SC2 falls. The count value C1 becomes "1" at time t11, "2" at time t12 and "3" at time t13.

When the 30° CA pulse is generated at time t14, the value stored in the second memory area Y (other than "1", "2", and "3") is written in the third memory area Z. Further, the value stored in the first memory area X (other than "1", "2" and "3") is written in the second memory area Y. Furthermore, the count value C1 of "3" is written in the first memory area X. The combination of the values stored in those memory areas X, Y and Z is not yet present on the map in FIG. 18. Therefore, neither the number N1 nor the count value CCR is computed. As a result, the crank angle is not detected.

At the subsequent time t15, the count value CCR has not been acquired yet. In the period from this time t15 to time t18 at which the 30° CA pulse is generated next, therefore, the same processing as performed in the period from time t11 to time t14 is carried out. The count value C1 becomes "1" at time t15, "2" at time t16 and "3" at time t17.

When the 30° CA pulse is generated at time t18, the value stored in the second memory area Y (other than "1", "2" and "3") is written in the third memory area Z. Further, the value of "3" stored in the first memory area X is written in the second memory area Y. Furthermore, the count value C1 of "3" is written in the first memory area X. The combination of the values stored in those memory areas X, Y and Z is not yet present on the map in FIG. 18. Therefore, neither the number N1 nor the count value CCR is computed. Thus, the crank angle is not detected.

At the next time t19, the count value CCR has not been acquired yet. In the period from this time t19 to time t20 at which the 30° CA pulse is generated next, therefore, the same processing as performed in the period from time t11 to time t14 or in the period from time t15 to time t18 is executed. There is no second tooth 108 in the segment G7 on the crank rotor 104. In the period between times t19 and t20 corresponding to that segment G7, therefore, there is no falling of the second detection signal SC2 based on the detection of the second tooth 108, and what is done simply is to set the count value C1 to "1" at time t19.

When the 30° CA pulse is generated at time t20, the value of "3" stored in the second memory area Y is written in the third memory area Z. Further, the value of "3" stored in the first memory area X is written in the second memory area Y. Furthermore, the count value C1 of "1" is written in the first memory area X. The combination of the values stored in those memory areas X, Y and Z (1, 3, 3) exists on the map in FIG. 18. In step 430 in the routine in FIG. 16, therefore, "8" is acquired as the number N1 corresponding to the combination (1, 3, 3) based on the map in FIG. 18. As the current flag value F1 is "0", in step 435 in the routine in FIG. 16, "8" is acquired as the count value CCR corresponding to the number N1 of "8" when the flag value F1 is "0" based on the map in FIG. 19.

At the time the engine 61 is started, as described above, if the crankshaft 67 rotates by an angle equivalent to four generations of the 30° CA pulse, or equivalent to four detections of the first tooth 107, the crank angle can be detected. In other words, if the crankshaft 67 turns approximately 90° CA (120° CA at a maximum) from the beginning of cranking, the crank angle can be detected accurately and the position of the piston 65 in each cylinder 64 can be determined precisely.

The operation of the apparatus after a certain time passes from the activation of the engine 61 will now be discussed. As the count value CCR has already been obtained at time t21 when a certain time has elapsed from the activation of the engine 61, the condition in step 400 is satisfied, so that the processes in steps 440–495 in the routine in FIG. 17 are carried out. It is assumed that immediately before time t21, the combination of the values stored in the memory areas X, Y and Z is (1, 2, 2). In the period illustrated in this timing chart, the flag value F1 is set to "0". Just before time t21, therefore, "5" is acquired as the number N1 based on the map in FIG. 18, and "5" is acquired as the count value CCR based on the map in FIG. 19.

In the period from time t21 to time t24 at which the 30° CA pulse is generated, the process in step 440 is repeated. That is, the count value C1 is incremented by "1" every time the second detection signal SC2 falls. The count value C1 becomes "1" at time t21, "2" at time t22 and "3" at time t23.

When the 30° CA pulse is generated at time t24, the value of "1" stored in the first memory area X is written in the second memory area Y. Further, the count value C1 of "3" is written in the first memory area X. As a result, the value in the first memory area X becomes "3" and the value in the second memory area Y becomes "1". Therefore, the condition in step 465 is not satisfied, and the processes in steps 485 and 490 are executed. Consequently, the count value CCR is changed to "6" from "5".

In the period from the subsequent time t25 to time t28 at which the 30° CA pulse is generated next, the count value C1 is incremented as done at the aforementioned times t21, t22 and t23. The count value C1 becomes "1" at time t25, "2" at time t26 and "3" at time t27.

When the 30° CA pulse is generated at time t28, the same processing as done at the time t24 is carried out. Specifically, the value of "13", stored in the first memory area X is written in the second memory area Y. Further, the count value C1 of "3" is written in the first memory area X. As a result, the value in the first memory area X becomes "3" and the value in the second memory area Y becomes "3". Therefore, the condition in step 465 is not met, and the processes in steps 485 and 490 are executed. Consequently, the count value CCR is changed to "7" from "6".

In the period from time t29 to time t30 at which the 30° CA pulse is generated next, the same processing as done in the period between the times t21–t24 or the time t25–t28 is executed. In the period from time t29 to time t30, which corresponds to the segment G7 on the crank rotor 104, what is merely done is to set the count value C1 to "1" at time t29.

When the 30° CA pulse is generated at time t30, the value of "3" stored in the first memory area X is written in the second memory area Y. Further, the count value C1 of "1" is written in the first memory area X. As a result, the value in the first memory area X becomes "1" and the value in the second memory area Y becomes "3". Therefore, the condition in step 465 is not satisfied, and the processes in steps 485 and 490 are executed. Consequently, the count value CCR is changed to "8" from "7".

The timing charts in FIGS. 21 and 22 illustrate time-dependent changes in the flag value F1, count value CCA and count value CCR. obtained in accordance with the routines illustrated in FIGS. 14, 16 and 17. FIG. 21 shows the state where the rotational phase of the intake-side cam shaft 74 with respect to the crankshaft 67 is most delayed by the VVT 93. In the state in FIG. 21, therefore, the timing for opening and closing the intake valve 72 is most delayed. FIG. 22 shows the state where the rotational phase of the intake-side cam shaft 74 with respect to the crankshaft 67 is most advanced by the VVT 93. In the state in FIG. 22, therefore, the timing for opening and closing the intake valve 72 is most advanced.

In both cases in FIGS. 21 and 22, the angles of change θa and θb of the intake-side cam shaft 74 can be determined by acquiring the phase difference between the count value CCR of the crank counter and the associated count value CCA of the cam counter. As apparent from FIGS. 21 and 22, the angles of change θa and θb increase as the rotational phase of the intake-side cam shaft 74 is advanced.

According to this embodiment, as specifically described above, every time the crankshaft 67 turns 30° CA, the first tooth 107 on the crank rotor 104 is detected by the magnetic sensors 105 and 106. During the period from the detection of one first tooth 107 to the detection of the next first tooth 107, the number of the second teeth 108 on the crank rotor 104 is counted. In other words, the count value C1 corresponding to the number of the second teeth 108 is acquired for each segment G between two adjacent first teeth 107. A specific number N1 is obtained based on the combination of the count values C1 corresponding to three adjacent segments G. This number N1 is associated with each of twelve first teeth 107 on the crank rotor 104. What is more, the combination of the numbers of the second teeth 108 located in three adjacent segments G differs from the combination of the numbers of the second teeth 108 located in any other three adjacent segments G. It is therefore possible to detect the crank angle based on the number N1 corresponding to each first tooth 107.

At the time the engine 61 is started, as described above, if the crankshaft 67 rotates by an angle equivalent to four detections of the first tooth 107, the crank angle can be detected. In other words, if the crankshaft 67 turns approximately 90° CA (120° CA at a maximum) from the beginning of cranking, the crank angle can be detected accurately and the position of the piston 65 in each cylinder 64 can be discriminated precisely.

While the engine 61 accomplishes one cycle (while the crankshaft 67 makes two rotations), the same number N1 appears twice. As mentioned above, however, the flag value F1 is changed to "0" from "1" or vice versa every time the crankshaft 67 makes one turn. It is therefore possible to positively detect the crank angle during two rotations of the crankshaft 67 from the count value CCR that has been acquired based on the flag value F1 and number N1.

The first teeth 107 and second teeth 108 are formed at substantially the same radius on the outer surface of the crank rotor 104. What is more, the width w2 of the second teeth 108 is smaller than the width w1 of the first teeth 107. This difference between the widths w1 and w2 makes it possible to discriminate as to whether the first tooth 107 or the second tooth 108 is passing in front of the magnetic sensors 105 and 106. It is therefore possible to design the rotor 104 thinner in the axial direction as compared with a design where the teeth 107 and 108 are arranged on different circles on the crank rotor 104. This feature permits the crank position sensor 103 to be smaller so as to facilitate the installment of the sensor 103 in the engine 61.

Six third teeth 114a and six fourth teeth 115a are spaced equidistantly on the outer surface of the cam rotor 111. Based on the count value CCA obtained from the detection of those teeth 114a and 115a, the rotational position of the intake-side cam shaft 74 can be detected precisely every time the cam shaft 74 rotates 30° CA. Increasing the number of the teeth 114a and 115a results in an improvement of the precision of the detection of the rotational position of the cam shaft 74. Based on the detected rotational position, therefore, the angle of change θ is computed accurately and the valve timing control is performed with a high precision.

As shown in FIGS. 16 and 17, a scheme of determining the count value CCR is changed between the time of activating the engine 61 and a later time. Specifically, at the activation time where the count value CCR has not been determined yet, the count value CCR is determined based on the values stored in the three memory areas X, Y and Z and the maps in FIGS. 18 and 19. After the activation of the engine at which the count value CCR has been determined, basically, the count value CCR is incremented every time the 30° CA pulse is generated. Once the count value CCR is determined, therefore, the count value CCR thereafter can be determined relatively easily, thus facilitating the detection of the crank angle.

As the processes in steps 465, 470, 475 and 480 in the routine in FIG. 17 are performed, it is possible to check if the count value CCR is correct. This is accomplished by using the fact that the condition in step 465 is satisfied every time the crankshaft 67 turns 360° CA. Specifically, the count values C1 corresponding to two segments G10 and G11 on the crank rotor 104 shown in FIG. 12 both become "1". Thus, the values in both memory areas X and Y both become "1". This occurs once at a specific rotational position of the crankshaft 67 while the crankshaft 67 rotates once.

As mentioned above, after the activation of the engine at which the count value CCR has been determined, the count value CCR is basically incremented every time the 30° CA pulse is generated. In this embodiment, however, every time the crankshaft 67 turns 360° CA, the count value CCR is set to the correct value ("0" or "12") in accordance with the flag value F1 at that time. Even if the count value CCR is in error, therefore, it can be corrected so that the crank angle can be detected more accurately.

This invention may be embodied in the following other forms.

The first and second embodiments may be adapted not only to a 4-cylinder engine 10 or 61, but also to a 6-cylinder engine, 8-cylinder engine or 12-cylinder engine as well.

Although the first grooves 22 are provided at angles of 30° CA on the crank rotor 21 in the first embodiment, the first grooves 22 may be provided at angles of 10° CA, and the angular distance is in no way limited to 30° CA. This is because the crank angle and the number N can be associated with each other regardless of the angular distances set between the first grooves 22. In the second embodiment, likewise, the number of the first teeth 107 and the angle α may be changed as needed.

Figure 2:
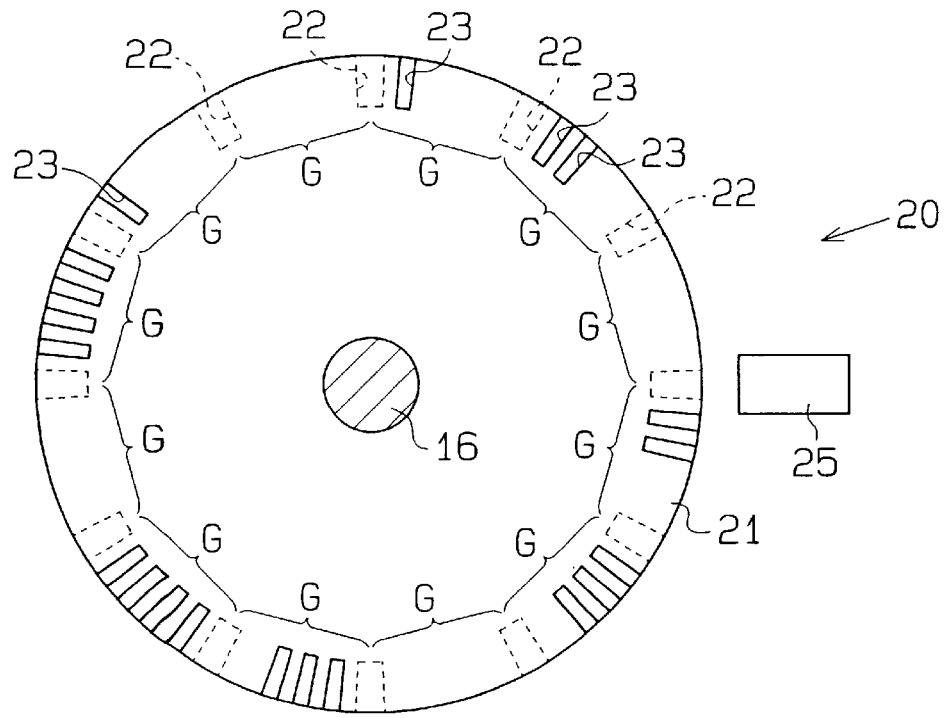
FIG. 2 is an explanatory diagram illustrating an exemplary crank position sensor.

The number of the second grooves 23 provided in segment G between two adjacent first grooves 22 is not limited to the range of 0 to 4, and their arrangement is not restricted to the one illustrated in FIG. 2. The number of the first grooves 22 and their arrangement may be changed freely as long as the number of the second grooves 23 provided in a segment G between two adjacent first grooves 22 differs from that of the second grooves 23 provided in an adjacent segment G and the combination of the numbers of the second grooves 23 located in two adjacent segments G differs from the combination of the numbers of the second grooves 23 located in any other two adjacent segments G.

According to the second embodiment, likewise, the number of the second teeth 108 provided in a segment G between two adjacent first teeth 107 and their arrangement may be altered. The number of the second teeth 108 and their arrangement may be changed freely if the combination of the numbers of the second teeth 108 located in three adjacent segments G differs from the combination of the numbers of the second teeth 108 located in another three adjacent segments G.

As the VVT 93, various types other than the above-described VVT in the second embodiment may be used as well. In the case of a rotary type VVT, for example, a rotor having a plurality of vanes is secured to the cam shaft. A housing is provided around the rotor in such a way as to be rotatable in relative to the cam shaft and rotor. A timing belt or a timing chain is put around the housing. By adjusting the hydraulic pressure to be supplied to hydraulic pressure chambers on both sides of each vane in the housing, the rotational phase of the cam shaft with respect to the crankshaft is changed to continuously alter the actuation timings of the intake valves or exhaust valves with respect to the crank angle.

The VVT in the second embodiment may be designed to change the actuation timing of the exhaust valve alone or change the actuation timings of both the intake valve and the exhaust valve.

In the second embodiment, the first teeth 107 and second teeth 108 may be changed to recesses or grooves.

In the second embodiment, the third teeth 114a and fourth teeth 115a may be changed to recesses or grooves.

In the first and second embodiments, the cam position sensor 30 or 109 need not be provided on the cam shaft 19 or 74. Instead of the cam position sensor 30 or 109, means of outputting different signals every time the crankshaft makes one turn may be installed in the engine.

The crank angle detecting apparatus according to the second embodiment may be adapted to an engine that does not have a VVT.

In the second embodiment, the numbers of the third teeth 114a and fourth teeth 115a and the angle β may be changed.

In the second embodiment, the size relationship between the tooth widths w1 and w2 may be reversed. Likewise, the size relationship between the tooth widths w3 and w4 may be reversed.

The processes in steps 450–480 in FIG. 17 may be omitted.

What is claimed is:

1. A crank angle detecting apparatus for an internal combustion engine having a plurality of cylinders, each cylinder retaining a piston, and a crank shaft operationally coupled to the pistons, wherein two rotations of the crankshaft correspond to one rotational cycle, such that each piston performs a stroke cycle during each rotational cycle, the stroke cycles being carried out in the cylinders with time phases in accordance with the rotational position of the crankshaft in one rotational cycle, the crank angle detecting apparatus comprising:

a crank rotor fixed on the crankshaft to rotate with the crankshaft;

a plurality of first-detected indicia provided on the periphery of the crank rotor at equal angular intervals of the crank rotor, wherein each first-detected indicium is like every other first-detected indicium in size and shape, the crank rotor having segments, wherein each adjacent pair of first-detected indicia defines a segment;

a plurality of second-detected indicia provided on the periphery of each of the segments and within the angular intervals defined by adjacent pairs of the first-detected indicia, wherein each second-detected indicium is like every other second-detected indicium in size and shape and different from every first-detected indicium in size or axial location, and wherein the only indicia appearing in the angular interval between any two adjacent first-detected indicia are second-detected indicia, wherein a combination of the numbers of second-detected indicia located on any given plurality of adjacent segments is different from a combination of the numbers of second-detected indicia located on any other plurality of adjacent segments having the same number of segments as the given plurality;

first detecting means, positioned to face rotational loci of both the first-detected indicia and the second-detected indicia, for detecting the first-detected and second-detected indicia that pass a position opposing the first detecting means in accordance with rotation of the crank rotor;

first counting means for counting the number of the second-detected indicia in each segment based on detection of the first-detected and second-detected indicia by the first detecting means;

signal generator for detecting a feature of the engine that indicates when the crankshaft makes one rotation; and determining means for determining the rotational position of the crankshaft in one rotational cycle when the first-detected indicia are detected by the first detecting means, based on a combination of the number of second-detected indicia located on at least two adjacent segments, which is based on a count value from the first counting means, and the indication of the signal generation means.

2. The apparatus according to claim 1, wherein the first-detected and second-detected indicia are located at different positions along the axis of the crank rotor.

3. The apparatus according to claim 1, wherein the first detecting means has a first detecting section and a second detecting section, the first detecting section being located to face a locus of the first-detected indicia to detect the first-detected indicia, the second detecting section being located to face a locus of the second-detected indicia to detect the second-detected indicia.

4. The apparatus according to claim 1, wherein the first-detected and second-detected indicia are both intersected by a plane that is perpendicular to the axis of the rotor.

5. The apparatus according to claim 4, wherein each of the first-detected indicia has an angular width different from that of each of the second-detected indicia, wherein the first detecting means distinguishes between the first-detected and second-detected indicia based on the difference between their angular widths.

6. The apparatus according to claim 5, wherein the first detecting means has a first detecting section and a second detecting section, and the first detecting section on is spaced from the second detecting section by an interval, and wherein the interval, as measured in the angular direction of the rotor, has a dimension that is between the angular widths of the first-detected and second-detected indicia.

7. The apparatus according to claim 1, wherein the internal combustion engine further comprises valves, which are arranged in association with the cylinders, and a camshaft, which makes one turn to drive the valves as the crankshaft makes two turns and the signal generator comprises:

a cam rotor provided on the camshaft to rotate with the camshaft;

a third-detected indicium located on the cam rotor over a range of 180 degrees;

a fourth-detected indicium located on the cam rotor over the remaining range of 180 degrees; and second detecting means, arranged to face rotational loci of both the third-detected and fourth-detected indicia, for detecting the third-detected and fourth-detected indicia that pass a position opposing the second detecting means in accordance with rotation of the cam rotor, wherein the second detecting means generates a first signal according to detection of the third-detected indicium and a second signal according to detection of the fourth-detected indicium, wherein the first signal alternates with the second signal every time the crankshaft makes one rotation.

8. The apparatus according to claim 7, wherein the internal combustion engine further comprises:

adjusting means for adjusting a rotational phase of the camshaft with respect to the crankshaft; and a plurality of third-detected elements included in the third-detected indicium, the third-detected elements being located at equal angular intervals of the cam rotor; and a plurality of fourth-detected elements included in the fourth-detected indicium, the fourth-detected elements being arranged on the cam rotor at equal angular intervals identical to the intervals of the third-detected elements, and each of the third-detected elements has an angular width different from that of each of the fourth-detected elements, wherein the second detecting means distinguishes between the third-detected and fourth-detected elements based on the difference between the angular widths of the third-detected and fourth-detected elements.

9. The apparatus according to claim 8, further comprising:

second counting means for counting a value indicative of the rotational position of the camshaft based on detection of the third-detected and fourth-detected elements by the second detecting means;

operation means for performing an operation with an upper limit of the rotational position of the camshaft corresponding to the number 360, based on a count value obtained by the second counting means; and reset means for resetting the second counting means when an operational value obtained by the operation means becomes 360.

10. The apparatus according to claim 9, wherein said second counting means includes setting means for setting said count value to a specific value when said signal generated by said second detecting means is changed.

11. The apparatus according to claim 1, wherein after a first determination of the rotational position of the crankshaft, the determining means determines the rotational position of the crankshaft based on the number of detections of the first-detected indicia by the first detecting means, and the first determined rotational position of the crankshaft is used as a reference.

12. The apparatus according to claim 1, further including an electronic control unit constituting said first counting means and said determination means.

13. A crank angle detecting apparatus for an internal combustion engine having a plurality of cylinders, each retaining a piston, and a crankshaft operationally coupled to the pistons, wherein two rotations of the crankshaft correspond to one rotational cycle, valves arranged in association with the cylinders, and a camshaft, which makes one turn to drive the valves as the crankshaft makes two turns, each piston performing one stroke cycle during each rotational cycle, the stroke cycles being carried out in the plurality of cylinders with time phases in accordance with a rotational position of the crankshaft in one rotational cycle, the crank angle detecting apparatus comprising:

a crank rotor fixed on the crankshaft to rotate with the crankshaft;

a plurality of first-detected indicia provided on the periphery of the crank rotor at equal angular intervals of the crank rotor, wherein each first-detected indicium is like every other first-detected indicium in size and shape, the crank rotor having segments, wherein each adjacent pair of first-detected indicia defines a segment;

a plurality of second-detected indicia provided on the periphery of each of the segments and within the angular intervals defined by adjacent pairs of the first-detected indicia, wherein each second-detected indicium is like every other second-detected indicium in size and shape and different from every first-detected indicium in size or axial location, and wherein the only indicia appearing in the angular interval between any two adjacent first-detected indicia are second-detected indicia, wherein a combination of the numbers of second-detected indicia located on any given plurality of adjacent segments is different from a combination of the numbers of second-detected indicia located on any other plurality of adjacent segments having the same number of segments as the given plurality;

first detecting means, positioned to face rotational loci of both the first-detected indicia and the second-detected indicia, for detecting the first-detected and second-detected indicia that pass a position opposing the first detecting means in accordance with rotation of the crank rotor;

first counting means for counting the number of the second-detected indicia in each segment based on detection of the first-detected and second-detected indicia by the first detecting means;

storage means for storing the latest of two count values obtained by the first counting means;

a cam rotor fixed to the camshaft to rotate with the camshaft;

a third-detected indicium provided on the cam rotor over a range of 180 degrees;

a fourth-detected indicium provided on the cam rotor over the remaining range of 180 degrees;

second detecting means arranged to face rotational loci of both the third-detected and fourth-detected indicia, for generating a first signal and a second signal, the second signal being different from the first signal, every time the crank rotor turns 360 degrees, based on detection of the third-detected and fourth-detected indicia that pass a position opposite to the second detecting means in accordance with rotation of the cam rotor; and determining means for determining the rotational position of the crankshaft in one rotational cycle when the first-detected indicia are detected by the first detecting means, based on a combination of the number of the second-detected indicia located on at least two consecutive segments, which is acquired based on the count values in the storage means, and the signals generated by the second detecting means.

14. The apparatus, according to claim 13, wherein the first-detected and second-detected indicia are located at different positions along the axis of the crank rotor.

15. The apparatus according to claim 12, wherein the first detecting means has a first detecting section and a second detecting section, the first detecting section being located to face a locus of the first-detected indicia to detect the first-detected indicia, the second detecting section being located to face a locus of the second-detected indicia to detect the second-detected indicia.

16. The apparatus according to claim 13, wherein the first-detected and second-detected indicia are both intersected by a plane that is perpendicular to the axis of the rotor.

17. The apparatus according to claim 16, wherein each of the first-detected indicia has an angular width different from that of each of the second-detected indicia wherein the first detecting means distinguishes between the first-detected and second-detected indicia based on the difference between their angular widths.

18. The apparatus according to claim 17, wherein the first detecting means has a first detecting section and a second detecting section, and the first detecting section is spaced from the second detecting section by an interval, and wherein the interval, as measured in the angular direction of the rotor, has a dimension that is between the angular widths of the first-detected and second-detected indicia.

19. The apparatus according to claim 13, wherein the internal combustion engine further comprises:

adjusting means for adjusting a rotational phase of the camshaft with respect to the crankshaft; and a plurality of third-detected elements included in the third-detected indicium, the third-detected elements being located at equal angular intervals of the cam rotor; and a plurality of fourth-detected elements included in the fourth-detected indicium, the fourth-detected elements being arranged on the cam rotor at equal angular intervals identical to the intervals of the third-detected elements, and each of the third-detected elements has an angular width different from that of each of the fourth-detected elements, wherein the second detecting means distinguishes between the third-detected and fourth-detected elements based on the difference between the angular widths of the third-detected and fourth-detected elements.

20. The apparatus according to claim 19, further comprising:

second counting means for counting a value indicative of the rotational position of the camshaft based on detection of the third-detected and fourth-detected elements by the second detecting means;

operation means for performing an operation with an upper limit of the rotational position of the camshaft corresponding to the number 360, based on a count value obtained by the second counting means; and reset means for resetting the second counting means when an operational value obtained by the operation means becomes 360.

21. The apparatus according to claim 20, wherein said second counting means includes setting means for setting said count value to a specific value when said signal generated by said second detecting means is changed.

22. The apparatus according to claim 13, wherein after a first determination of the rotational position of the crankshaft, the determination means determines the rotational position of the crankshaft based on the number of detections of the first-detected indicia by the first detecting means, and the first determined rotational position of the crankshaft is used as a reference.

23. The apparatus according to claim 13, further including an electronic control unit constituting said first counting means, said storage means and said determination means.

24. A crank angle detecting apparatus for an internal combustion engine, wherein the engine has a plurality of cylinders, each cylinder retaining a piston, and wherein a crankshaft is operationally coupled to the pistons such that the crankshaft rotates twice per engine cycle and the position of each piston depends upon the rotational position of the crankshaft, the crank angle detecting apparatus comprising:

a crank rotor provided on the crankshaft to rotate with the crankshaft, the rotor having a plurality of adjacent angular segments, each segment being demarcated by first indicia at equal angular intervals of the crank rotor, wherein each first indicium is like every other first indicium in size and shape, and each first indicium demarcates a segment, and wherein some of the segments have second indicia thereon and within the angular intervals defined by the first segments, wherein each second indicium is like every other second indicium in size and shape and different from every first indicium in size or axial location, such that at least no two adjacent segments have the same pattern of second indicia thereon, and the only indicia appearing between any two adjacent first indicia are second indicia;

a crank rotor indicia detector located in proximity to the rotor for detecting the first and second indicia;

a crank rotor counter for counting the number of the second indicia in each segment detected by the crank rotor indicia detector;

a cycle progress signal generator that generates a signal every time the crank-shaft completes a predetermined amount of rotation; and determining means for determining the rotational position of the crankshaft with respect to one engine cycle when one of the first indicia is detected by the crank rotor indicia detector based on the cycle progress signal and the number of second indicia counted on at least two consecutive segments by the crank rotor counter.

25. The apparatus according to claim 24, wherein the first indicia and the second indicia are separated from one another in the axial direction of the crankshaft.

26. The apparatus according to claim 25, wherein the crank rotor indicia detector includes a first detector for detecting the first indicia and a second detector for detecting the second indicia, and wherein the first detector and the second detector are separated from one another in the axial direction of the rotor.

27. The apparatus according to claim 24, wherein the first indicia and the second indicia are circularly arranged generally along the same circle on the rotor.

28. The apparatus according to claim 27, wherein the detector includes a first detector and a second detector, wherein the first detector is spaced from the second detector.

29. The apparatus according to claim 24, wherein the internal combustion engine further comprises valves, which are arranged in association with the cylinders, and a cam shaft, wherein the cam shaft makes one turn for every engine cycle, and wherein the means for generating a cycle progress signal comprises:

a cam rotor connected to the cam shaft to rotate with the cam shaft;

a third indicia provided on the cam rotor means to demarcate a range of 180 degrees; and a cam rotor indicia detector arranged in proximity to the third indicia for detecting passage of the third indicia as the cam rotor rotates.

30. The apparatus according to claim 29, wherein the internal combustion engine further comprises adjusting mechanism for adjusting a rotational phase of the cam shaft with respect to the crankshaft, and wherein the third indicia are a plurality of elements arranged at equal intervals in a circumferential direction of the cam rotor, and wherein the cam rotor further includes fourth indicia demarcating another 180 degree range of the cam rotor, the fourth indicia also being a plurality of elements, wherein the cam shaft rotor indicia detector generates one signal based on detection of the third indicia and another signal based on detection of the fourth indicia.

31. The apparatus according to claim 24, wherein the determining means determines the rotational position of the crankshaft based on the number of detections of the first indicia by the crank rotor detector, wherein a first determined rotational position of the crankshaft is taken as a reference.

32. The apparatus according to claim 24, wherein no three adjacent segments have the same pattern of second indicia thereon.

* * * * *

UNITED STATES PATENT AND TRADEMARK OFFICE
CERTIFICATE OF CORRECTION

PATENT NO. : 6,041,647
DATED : March 28, 2000
INVENTOR(S) : Yuji Matsuoka

It is certified that error appears in the above-identified patent and that said Letters Patent is hereby corrected as shown below:

| Column | Line | |
|---|---|---|
| 8 | 8 | After "lagging" insert --,--. |
| 21 | 36 | Change '"13",' to --"3"--. |
| 23 | 52 | Before "segment" insert --a--. |

Signed and Sealed this

Fifteenth Day of May, 2001

Attest:

NICHOLAS P. GODICI

Attesting Officer    Acting Director of the United States Patent and Trademark Office